United States Patent
Zhu et al.

(10) Patent No.: US 12,362,529 B2
(45) Date of Patent: Jul. 15, 2025

(54) EFFICIENT ENERGY TRANSFER FROM $Er^{3+}$ to $Ho^{3+}$ and $Dy^{3+}$ IN MID-INFRARED MATERIALS

(71) Applicant: ARIZONA BOARD OF REGENTS ON BEHALF OF THE UNIVERSITY OF ARIZONA, Tucson, AZ (US)

(72) Inventors: Xiushan Zhu, Tucson, AZ (US); Nasser N. Peyghambarian, Tucson, AZ (US)

(73) Assignee: Arizona Board of Regents on Behalf of the University of Arizona, Tucson, AZ (US)

( * ) Notice: Subject to any disclaimer, the term of this patent is extended or adjusted under 35 U.S.C. 154(b) by 484 days.

(21) Appl. No.: 17/779,644

(22) PCT Filed: Nov. 25, 2020

(86) PCT No.: PCT/US2020/062251
§ 371 (c)(1),
(2) Date: May 25, 2022

(87) PCT Pub. No.: WO2021/108568
PCT Pub. Date: Jun. 3, 2021

(65) Prior Publication Data
US 2022/0407281 A1     Dec. 22, 2022

Related U.S. Application Data

(60) Provisional application No. 62/941,137, filed on Nov. 27, 2019.

(51) Int. Cl.
*H01S 3/067*     (2006.01)
*H01S 3/0941*     (2006.01)
(Continued)

(52) U.S. Cl.
CPC ........ *H01S 3/0675* (2013.01); *H01S 3/09415* (2013.01); *H01S 3/1606* (2013.01);
(Continued)

(58) Field of Classification Search
CPC ...... H01S 3/1608; H01S 3/1606; H01S 3/161; H01S 3/0675; H01S 3/09415; H01S 3/171; H01S 3/173
See application file for complete search history.

(56) References Cited

U.S. PATENT DOCUMENTS 4,136,316 A * 1/1979 Chicklis ............. C09K 11/7773
372/17
4,330,763 A * 5/1982 Esterowitz ................ H01S 3/16
372/41
(Continued)

FOREIGN PATENT DOCUMENTS

CN     102618928 A * 8/2012
CN     102787357 A * 11/2012
(Continued)

OTHER PUBLICATIONS

Sousa et al., "Erbium to Dysprosium Energy-Transfer Mechanism and Visible Luminescence in Lead-Cadmium-Fluorogermanate Glass Excited at 405 nm", Mar. 12, 2019, Chemical Physics Letters, 723, 28-32. (Year: 2019).*

(Continued)

*Primary Examiner* — Joshua King
(74) *Attorney, Agent, or Firm* — Stuart H. Mayer; Kaplan Breyer Schwarz LLP

(57) ABSTRACT

A solid-state laser system includes a gain medium having an optical resonator defined therein. The gain medium is co-doped with first and second active elements. The first active element is $Er^{3+}$ and the second active element is $Ho^{3+}$ or $Dy^{3+}$. The solid-state laser system also includes a pump (Continued)

source coupled to the gain medium for pumping the gain medium with pump light.

10 Claims, 18 Drawing Sheets

(51) Int. Cl.
*H01S 3/16* (2006.01)
*H01S 3/17* (2006.01)

(52) U.S. Cl.
CPC ............ *H01S 3/1608* (2013.01); *H01S 3/161* (2013.01); *H01S 3/171* (2013.01); *H01S 3/173* (2013.01)

(56) References Cited

U.S. PATENT DOCUMENTS

| | | | | | |
|---|---|---|---|---|---|
| 4,701,928 | A | * | 10/1987 | Fan | H01S 3/16 372/68 |
| 4,902,127 | A | * | 2/1990 | Byer | H01S 3/0606 359/347 |
| 4,974,230 | A | * | 11/1990 | Hemmati | H01S 3/16 372/71 |
| 5,379,149 | A | * | 1/1995 | Snitzer | H01S 3/06716 359/341.5 |
| 7,298,547 | B1 | * | 11/2007 | Jiang | H01S 3/06795 359/341.1 |
| RE41,438 | E | * | 7/2010 | Hall | H01S 3/10023 372/19 |
| 7,778,290 | B2 | * | 8/2010 | Sacks | H01S 3/06716 372/27 |
| 10,608,399 | B1 | * | 3/2020 | Yang | H01S 3/1618 |
| 2002/0172251 | A1 | * | 11/2002 | Ohtsuka | H01S 3/067 372/75 |
| 2003/0152115 | A1 | * | 8/2003 | Jiang | H01S 3/06716 372/6 |
| 2005/0265411 | A1 | * | 12/2005 | Takeuchi | H01S 3/0941 372/39 |
| 2007/0153839 | A1 | * | 7/2007 | Varming | H01S 3/0675 372/6 |
| 2007/0189338 | A1 | * | 8/2007 | Seelert | H01S 3/2383 372/6 |
| 2008/0267228 | A1 | * | 10/2008 | Sacks | H01S 3/094003 385/27 |
| 2009/0262761 | A1 | * | 10/2009 | Khitrov | H01S 3/06754 372/6 |
| 2011/0228382 | A1 | * | 9/2011 | Mattsson | H01S 3/0675 359/341.3 |
| 2012/0281720 | A1 | * | 11/2012 | Fermann | H01S 3/0057 372/6 |
| 2014/0140361 | A1 | * | 5/2014 | Jiang | G02B 6/02338 359/341.1 |
| 2016/0099542 | A1 | * | 4/2016 | Shin | H01S 3/0675 359/341.32 |
| 2016/0280586 | A1 | * | 9/2016 | Jha | C09K 11/883 |
| 2021/0190916 | A1 | * | 6/2021 | Ban | H01S 3/1618 |

FOREIGN PATENT DOCUMENTS

| | | | | | |
|---|---|---|---|---|---|
| CN | 109023523 | A | * | 12/2018 | ............ C30B 11/00 |
| CN | 109023524 | A | * | 12/2018 | ............ C30B 11/00 |
| FR | 2837290 | A1 | * | 9/2003 | ......... H01S 3/06704 |
| WO | WO-8707447 | A1 | * | 5/1987 | |
| WO | WO-2008061530 | A1 | * | 5/2008 | .......... C03C 13/046 |
| WO | WO-2009063388 | A2 | * | 5/2009 | .............. H01D 3/16 |
| WO | WO-2011009198 | A1 | * | 1/2011 | .......... H01S 3/0675 |
| WO | WO-2021080998 | A2 | * | 4/2021 | .......... C03C 13/045 |

OTHER PUBLICATIONS

Wang et al., "Investigation of Broadband Mid-Infrared Emission and Quantitative Analysis of Dy-Er Energy Transfer in Tellurite Glasses under Different Excitations", Nov. 13, 2017, Optics Express, vol. 25, No. 23, 29512-29525. (Year: 2017).*
Ragin et al., "Up-Conversion Luminescence in Low Phonon Heavy Metal Oxide Glass Co-Doped with Er3+/Ho3+ Ions", Mar. 31, 2018, Photonics Letters of Poland, vol. 10, No. 1, 2-4. (Year: 2018).*
Wang et al., "Broadband 2.9 um Emission and High Energy Transfer Efficiency in Er3+/Dy3+ Co-Doped Fluoroaluminate Glass", Dec. 11, 2017, Optics Materials, 75, 875-879. (Year: 2017).*
Huang et al., "Ho3+/Er3+ Co-Doped Fluoride Glass Sensitized by Tm3+ Pumped by a 1550 nm Laser Diode for Efficient 2.0 um Laser Applications", Sep. 15, 2015, Optics Letters, vol. 40, No. 18, 4297-4300. (Year: 2015).*
Majewski et al., "Dysprosium-Doped ZBLAN Fiber Laser Tunable from 2.8 um to 3.4 um, pumped at 1.7 um", Feb. 21, 2018, arXiv: 1802.07413v1, 1-4. (Year: 2018).*

* cited by examiner

EFFICIENT ENERGY TRANSFER FROM $Er^{3+}$ to $Ho^{3+}$ and $Dy^{3+}$ IN MID-INFRARED MATERIALS

CROSS REFERENCE TO RELATED APPLICATION

This application claims the benefit of U.S. Provisional Application Ser. No. 62/941,137, filed Nov. 27, 2019, the contents of which are incorporated herein by reference.

BACKGROUND

Lasers in the mid-infrared (mid-IR) spectral region are of great interest for a wide range of scientific and technological applications including spectroscopy, medical surgery, free space communication, remote sensing and material processing. Compared to other laser platforms, optical fiber lasers have many well-known advantages such as excellent beam quality, high power scalability, outstanding heat dissipation capability, simplicity and compactness. ZBLAN ($ZrF_4$—$BaF_2$—$LaF_3$—$AlF_3$—$NaF$) fibers have been widely used as the host media for rare-earth ions for mid-IR fiber lasers and the nonlinear media for high-efficiency ultra-broad band supercontinuum generation due to their low intrinsic loss, wide transparency window, and small phonon energy. Rare-earth ($Er^{3+}$, $Ho^{3+}$, and $Dy^{3+}$) doped ZBLAN fiber lasers operating in the 3 μm wavelength region have attracted considerable interest because their emissions cover the fundamental vibrational absorption lines of molecules containing C—H, N—H, and O—H chemical bonds, and can be used for a lot of practical applications, such as medical diagnosis and surgery, remote sensing for gas and vapor, and material processing.

The first demonstration of rare-earth-doped ZBLAN fiber laser at 3 μm can be dated back to 1988 and thereafter considerable investigations on $Er^{3+}$-doped ZBLAN fiber lasers have been completed due to the readily available diode lasers at the 790 nm and 980 nm absorption peaks of $Er^{3+}$. Several watt-level $Er^{3+}$-doped ZBLAN fiber lasers have been reported in late 1990s. In 2007, Zhu and Jain reported the first 10-W-level 3 μm fiber laser, which was demonstrated with a 4-m 6 mol % $Er^{3+}$-doped double-clad ZBLAN fiber and a high power diode pump laser at 976 nm. A slope efficiency of 21.3% was obtained by taking the advantage of energy transfer up-conversion process between $Er^{3+}$ and $Er^{3+}$ ions. Since then, several 10-watt-level $Er^{3+}$-doped ZBLAN fiber lasers with higher output powers have been reported. In 2015, a 30-W $Er^{3+}$-doped all-fiber laser operating at 2938 nm was demonstrated by using ZBLAN fiber Bragg gratings to form the all-fiber laser cavity and combining several high power laser diodes near 980 nm to provide a total pump power of 188 W.

Compared to $Er^{3+}$ and $Ho^{3+}$ doped ZBLAN fiber lasers that generally produce lasers below 3 μm, $Dy^{3+}$-doped ZBLAN fiber lasers have attracted more significant attention recently because $Dy^{3+}$ has a much broader emission spectral bandwidth in the 3 μm wavelength region and is able to produce laser beyond 3 μm. $Dy^{3+}$-doped ZBLAN fiber lasers have already been demonstrated at 2.96 μm, 3.15 μm, and 3.24 μm. The ultra-broadband emission also allows us to develop wavelength tunable fiber laser with wide tunable range and ultrashort pulse fiber laser. However, most of these $Dy^{3+}$-doped fiber lasers were pumped with fiber lasers or solid-state lasers in the pump absorption bands of $Dy^{3+}$. There is great interest in developing diode-pumped $Dy^{3+}$-doped fiber lasers at 3 μm so that more compact and robust laser source can be developed. However, high power diode lasers in the four absorption bands are still not available.

SUMMARY

An embodiment of the subject matter described herein provides a solid-state laser system. The solid-state laser system includes a gain medium having an optical resonator defined therein. The gain medium is co-doped with first and second active elements. The first active element is $Er^{3+}$ and the second active element is $Ho^{3+}$ or $Dy^{3+}$. The solid-state laser system also includes a pump source coupled to the gain medium for pumping the gain medium with pump light.

In one particular embodiment the gain medium includes a host material that incorporates the first and second active elements. In some cases the host material includes a metal fluoride glass such as ZBLAN, a fluoride crystal or other mid-infrared crystal, or a chalcogenide glass.

In yet another particular embodiment the optical waveguide is an optical fiber. In some cases first and second distributed Bragg gratings are formed in the optical fiber to define the optical resonator.

In yet another particular embodiment the pump source is configured to operate at a wavelength of 976 nm. In some cases the pump source is a diode laser.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure.

DETAILED DESCRIPTION

Figure 1A:
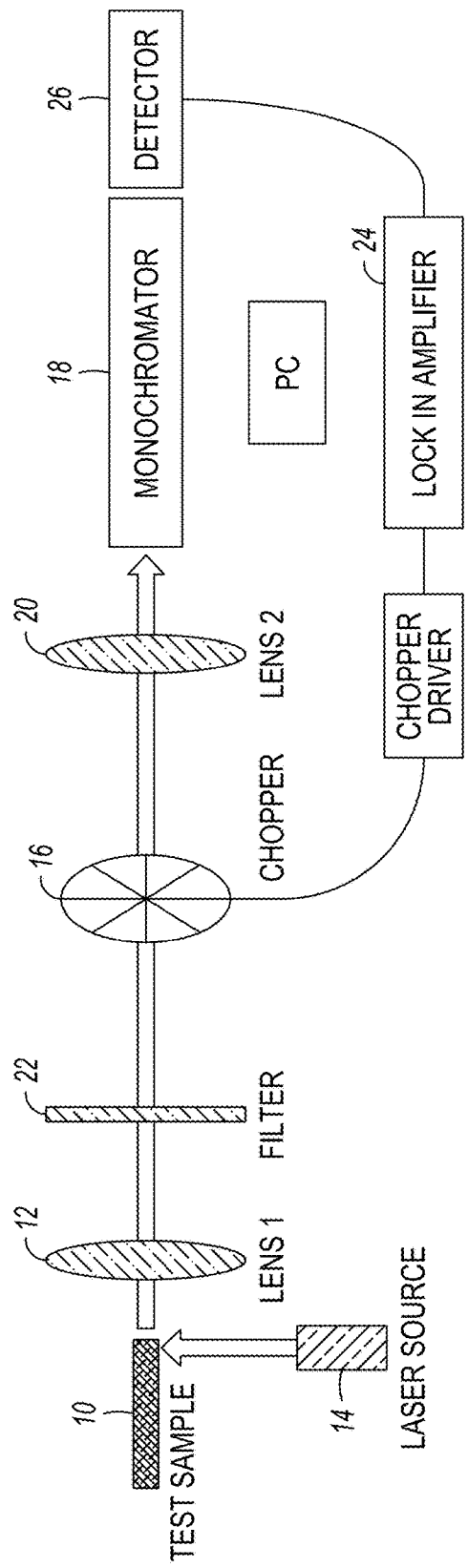
FIG. 1(a) shows a fluorescence measurement arrangement used to measure the transmission spectra of glass samples.

Compared to $Er^{3+}$-doped ZBLAN fiber lasers, $Ho^{3+}$- and $Dy^{3+}$-doped ZBLAN fiber lasers can operate at a wavelength beyond 3 μm and even at 3.380 μm, where diode-pumped high power laser sources are in great demand for most of the applications mentioned above. However, high efficiency 10s-watt diode lasers at the near-infrared (near-IR) absorption peaks of $Ho^{3+}$ (885 nm and 1150 nm) and $Dy^{3+}$ (1090 nm, 1300 nm, and 1700 nm) are still not available. So far, the maximum output power of a $Ho^{3+}$-doped ZBLAN fiber laser at 3 μm was 2.5 W, which was pumped with a 1100 nm $Yb^{3+}$-doped silica fiber laser. The maximum output power of a $Dy^{3+}$-doped ZBLAN fiber laser pumped at near-IR was 180 mW. Most recently, in-band pumping of the $Dy^{3+}$-doped ZBLAN fiber lasers with a $Er^{3+}$-doped ZBLAN fiber laser at 3 μm was proposed and an efficiency as high as 73% was obtained. A 10-W $Dy^{3+}$-doped ZBLAN fiber laser in all-fiber configuration was also demonstrated recently by in-band pumping with an $Er^{3+}$-doped all-fiber laser at 2.83 μm.

Described herein is an $Er^{3+}$ synthesized $Ho^{3+}$- and $Dy^{3+}$-doped ZBLAN fibers that can be used to develop compact all-fiber lasers above 3 μm directly pumped with readily available high power high efficiency diode lasers near 980 nm. Presented below are spectroscopic studies of the $Er^{3+}$, $Ho^{3+}$, $Dy^{3+}$, and their synthesized ZBLAN glasses and the energy transfer processes between these ions are investigated. The experimental results confirm that efficient energy transfer from $Er^{3+}$ to $Ho^{3+}$ and $Dy^{3+}$ can occur in $Er^{3+}$/$Ho^{3+}$ and $Er^{3+}$/$Dy^{3+}$ co-doped ZBLAN glasses. The energy transfer coefficients were also obtained by solving the rate equations and fitting the measured fluorescence. Also demonstrated below is one example of a 3 μm $Er^{3+}$/$Dy^{3+}$ co-doped ZBLAN fiber laser.

Glass Preparation and Experimental Setup

Rare-earth doped ZBLAN glasses with a composition of $ZrF_4$—$BaF_2$—$LaF_3$—$AlF_3$—$NaF$ as the host network were fabricated by FiberLabs Inc. using the conventional melting-quenching technique. 2 mol % $Er^{3+}$-doped, 1 mol % $Ho^{3+}$-doped, 1 mol % $Dy^{3+}$-doped, 2 mol % $Er^{3+}$/1 mol % $Ho^{3+}$ co-doped, and 2 mol % $Er^{3+}$/1 mol % $Dy^{3+}$ co-doped ZBLAN glasses were prepared. The singly doped ZBLAN glass samples with a thickness of about 1 cm were cut and polished for the transmission spectrum measurement. The singly doped and co-doped glass samples with a thickness of 1 mm were cut and their two large-area surfaces and one small-area surface were polished to optical quality for the fluorescence and lifetime measurements.

The transmission spectra of the glass samples from 300-3300 nm were measured with a Cary 5000 spectrometer. The fluorescence emissions of the glass samples and the lifetimes of excited states of the $Er^{3+}$, $Ho^{3+}$, and $Dy^{3+}$ were measured with conventional techniques with the experimental setups depicted in FIGS. 1(a) and 1(b), respectively. As shown in FIG. 1(a), the pump light from pump source 14 was launched onto the glass sample 10 at a small region close to the edge of the polished small-area surface. The fluorescence emitting from the glass sample 10 was collected by a black diamond aspheric lens 12 (Thorlab C036TME-E) from the polished small-area surface at 90° to the direction of the pump light. For the fluorescence measurement, near-IR continuous-wave (CW) laser sources 14 at their absorption peaks were used as the pumps to excite $Er^{3+}$, $Ho^{3+}$, and $Dy^{3+}$. The CW fluorescence was modulated by a mechanical chopper 16 and focused into a monochromator 18 (ORIEL Instruments, Model 77702) by a $CaF_2$ plano-convex lens 20 (Thorlab LA5370). To filter out the scattered pump light and the fluorescence of no interest, long-pass filters 22 with cut-on wavelengths of 2500 nm (Spectrogon LP-2500 nm) and 1250 nm (Thorlab FEL1250) were used for the fluorescence measurement in the 3 μm and near-IR wavelength regions, respectively. The fluorescence intensity was measured with lock-in detection technique by using a lock-in amplifier 24 (Princeton Applied Research, Model 5209) to detect the modulated signal received by the detector 26 of the monochromator 18. A Labview software was used to control the monochromator and record the fluorescence spectrum.

Figure 1B:
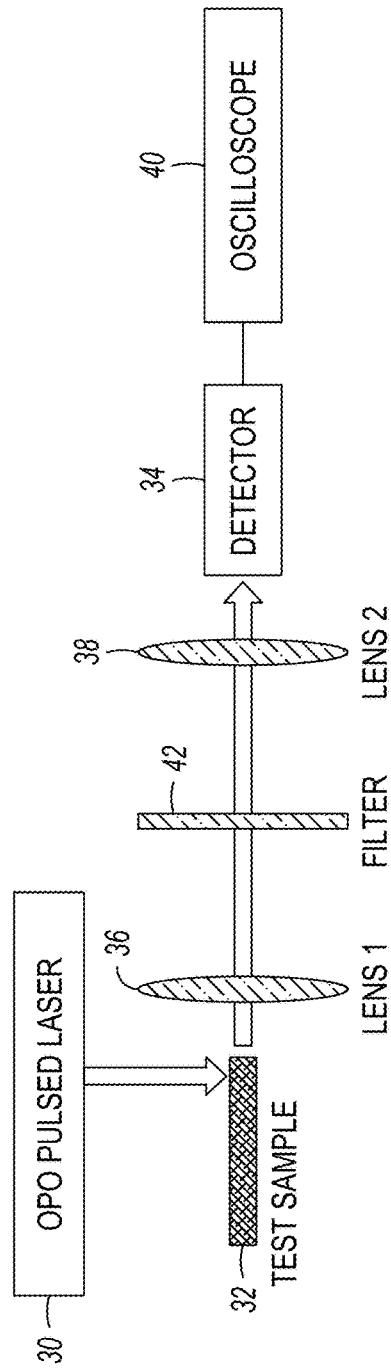
FIG. 1(b) shows a lifetime measurement arrangement for measuring the excited states in the glass samples.

For the lifetime measurement using the setup in FIG. 1(b), a nanosecond pulse optical parametric oscillator (OPO) laser 30 with a pulse duration of 10 ns at a repetition rate of 10 Hz (Continuum Surelite) was used as the pump source. The fluorescence emitting from the glass sample 32 was collected and focused onto a detector (Thorlab PDA 20H) by two aspheric black diamond lenses 26 and 38 (Thorlab C036TME-E). The fluorescence decaying curve was recorded by an oscilloscope 40 (Tektronics TDS 1012). A set of filters 42 were used to obtain the fluorescence only corresponding to the transition of interest from a specific energy level. The lifetime of an energy level was achieved by fitting the fluorescence decay curve with an exponential decay function.

Experimental Results

Figure 2:
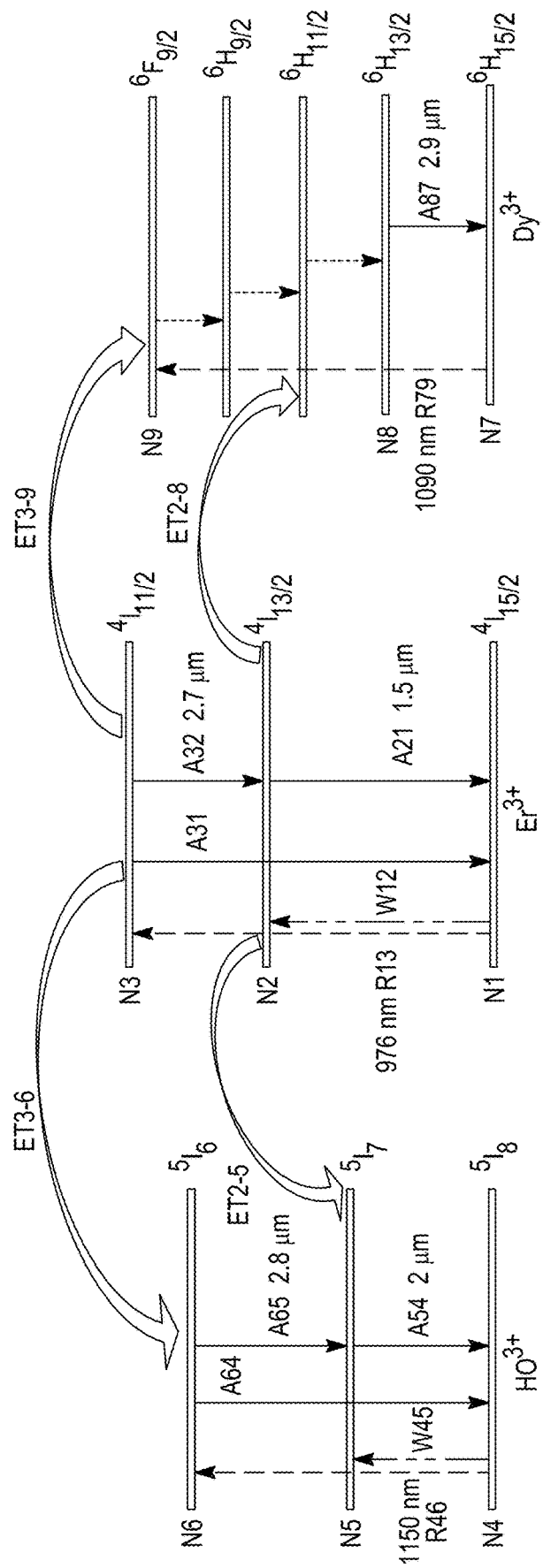
FIG. 2. shows partial energy-level diagrams of $Er^{3+}$, $Ho^{3+}$, and $Dy^{3+}$ and the transitions and energy transfer processes related to the emissions in the mid-IR.
Figure 3A:
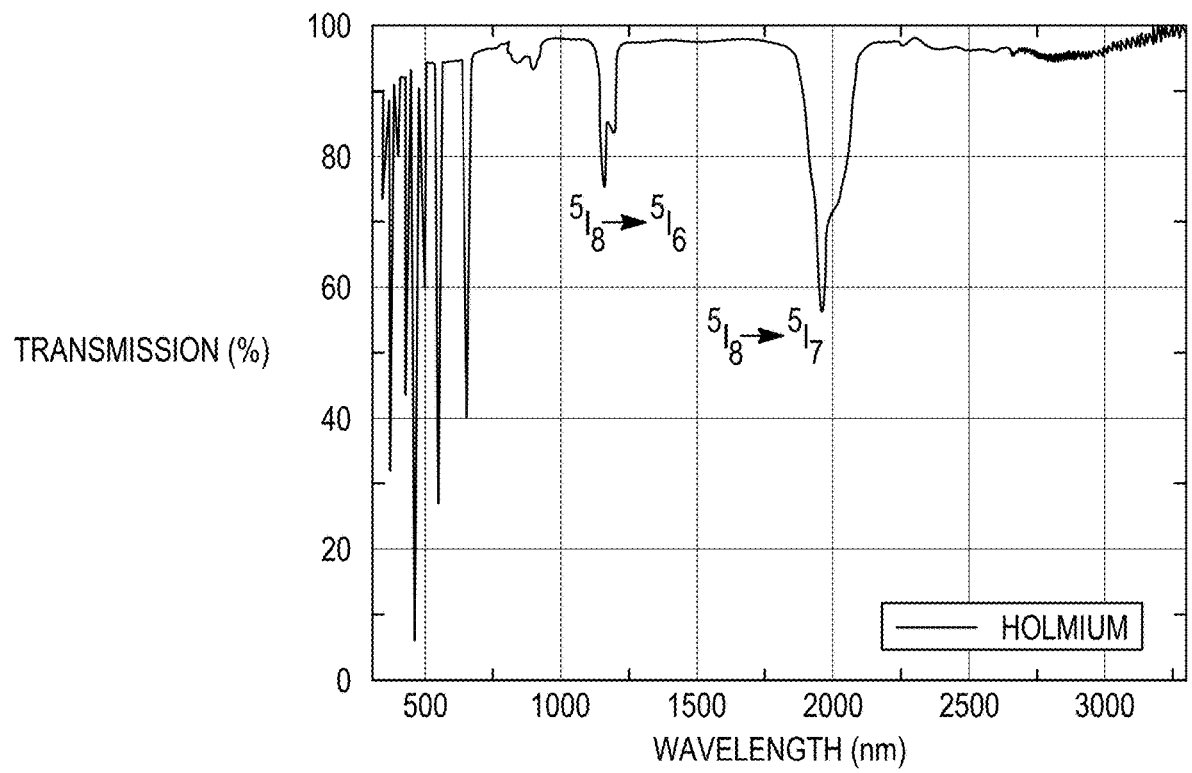
FIG. 3 shows the measured transmission spectra of 0.75 cm-thick 1 mol % $Ho^{3+}$-, 1.1 cm-thick 2 mol % $Er^{3+}$-, and 1 cm-thick 1 mol % $Dy^{3+}$-doped ZBLAN glass samples.
Figure 3B:
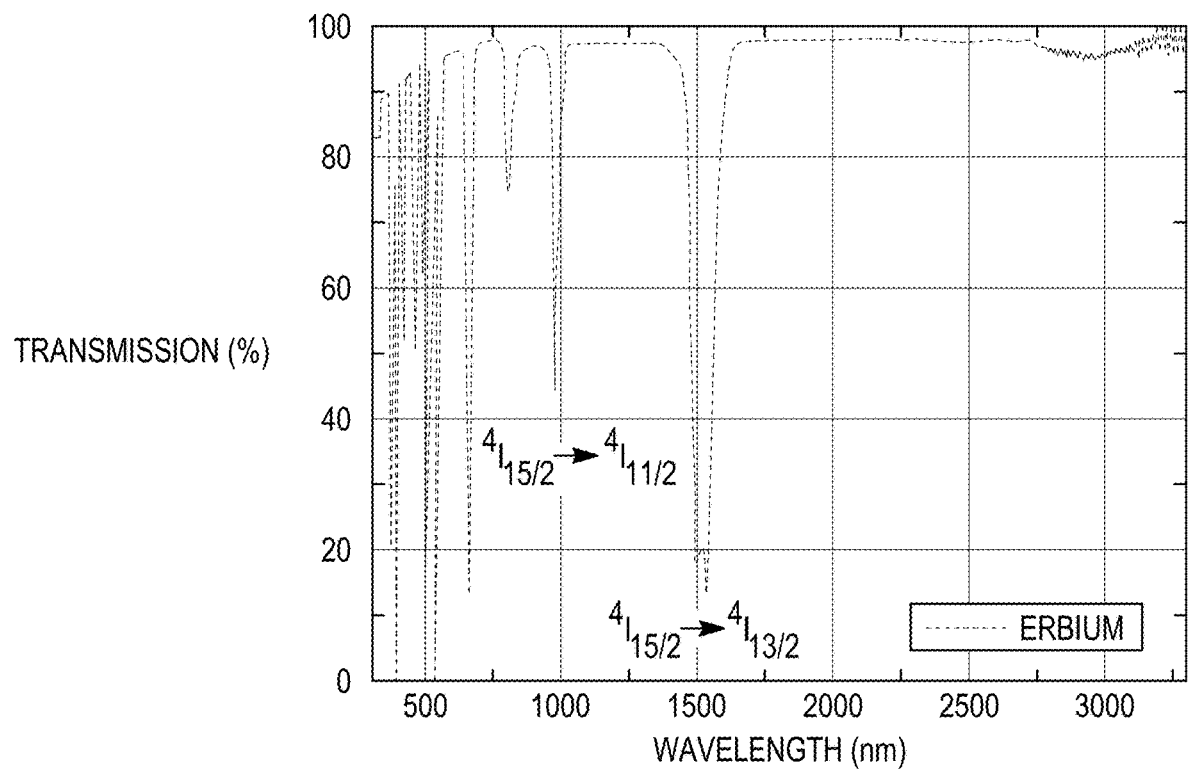
Figure 3C:
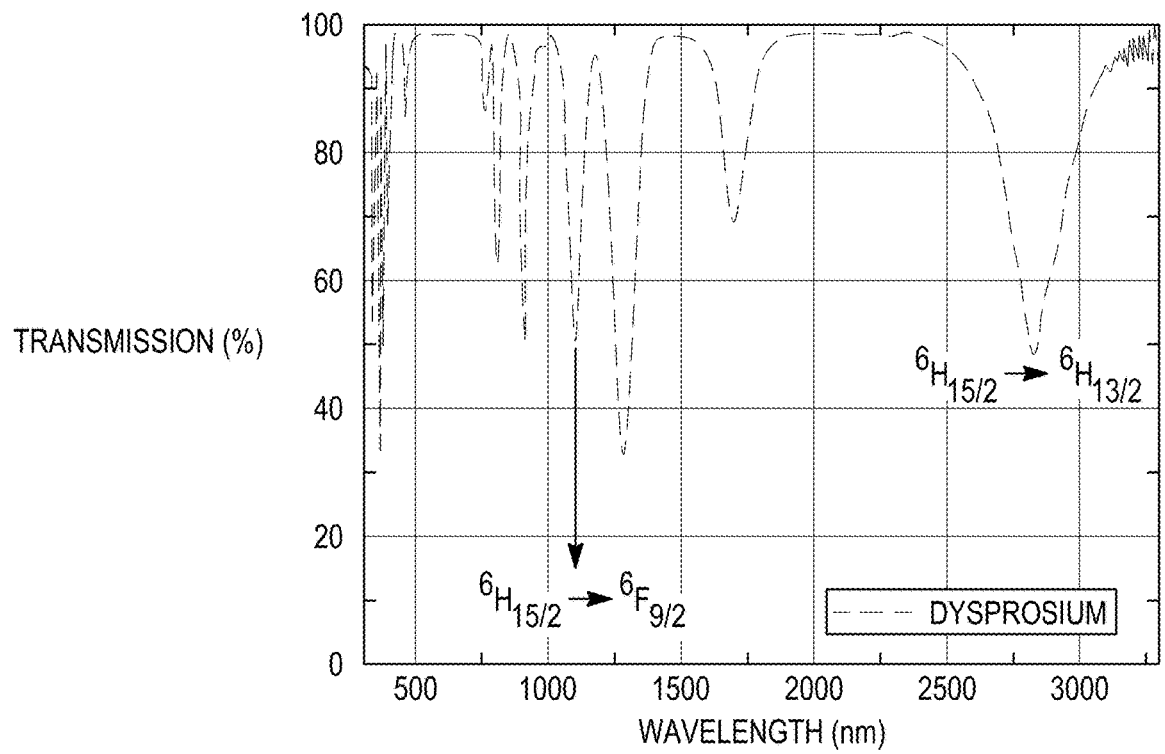

The partial energy-level diagrams of $Er^{3+}$, $Ho^{3+}$, and $Dy^{3+}$, and the transitions are shown in FIG. 2. $Er^{3+}$ ions in the ground state can be excited to the excited level $^4I_{11/2}$ ($^4I_{15/2} \rightarrow ^4I_{11/2}$) by absorbing near-IR light at 980 nm. The radiative transition from level $^4I_{11/2}$ to level $^4I_{13/2}$ generates the light in the 3 μm wavelength region and that from level $^4I_{13/2}$ to the ground level generates the light in the 1.5 μm wavelength region. $Ho^{3+}$ ions has a near-IR absorption band at 1150 nm and the ground state absorption ($^5I_8 \rightarrow ^5I_6$) at this wavelength can populate the upper laser level $^5I_6$ for the 3 μm emission ($^5I_6 \rightarrow ^5I_7$). The radiative transition from level $^5I_7$ to the ground level $^5I_8$ generates the light in the 2 wavelength region. $Dy^{3+}$ ions have three near-IR absorption bands at 1090 nm, 1300 nm, and 1700 nm. The 3 μm emission can be produced by the radiative transition from level $^6H_{13/2}$ to level $^6H_{15/2}$. The transmission spectra of 2 mol % $Er^{3+}$-doped, 1 mol % $Ho^{3+}$-doped, and 1 mol % $Dy^{3+}$-doped ZBLAN glass samples with thickness of about 1 cm were measured and are shown in FIG. 3. Because the absorption bands of $Ho^{3+}$ and $Dy^{3+}$ at 1150 nm and 1090 nm are close to the absorption band of $Er^{3+}$ at 980 nm and the energy levels $^5I_6$ and $^6F_{9/2}$ are lower than that of the exited level $^4I_{11/2}$ of $Er^{3+}$, energy transfer from level $^4I_{11/2}$ of $Er^{3+}$ to level $^5I_6$ of $Ho^{3+}$ ($ET_{3-6}$) and level $^6F_{9/2}$ of $Dy^{3+}$ ($ET_{3-9}$) as shown in FIG. 2 could happen when they are co-doped in a ZBLAN glass.

Figure 4A:
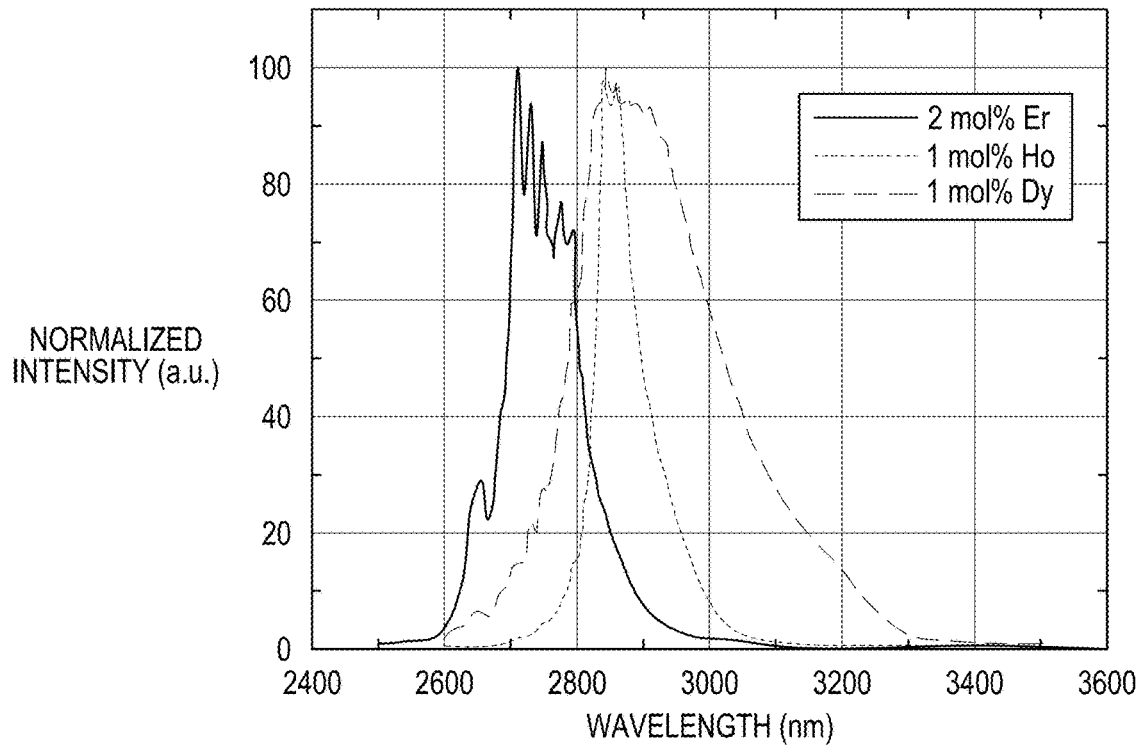
FIG. 4(a) shows the measured fluorescence spectra of the 2 mol % $Er^{3+}$, 1 mol % $Ho^{3+}$-, and 1 mol % $Dy^{3+}$-doped ZBLAN glasses in the 3 μm wavelength region.
Figure 4B:
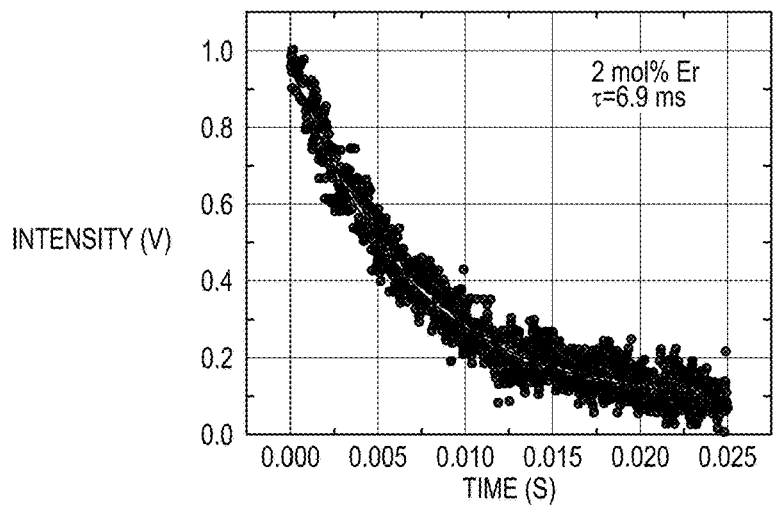
FIG. 4(b) shows the measured 3 μm fluorescence decay curves and fitting curves of the 2 mol % $Er^{3+}$-, 1 mol % $Ho^{3+}$-, and 1 mol % $Dy^{3+}$-doped ZBLAN glasses.
Figure 4B:
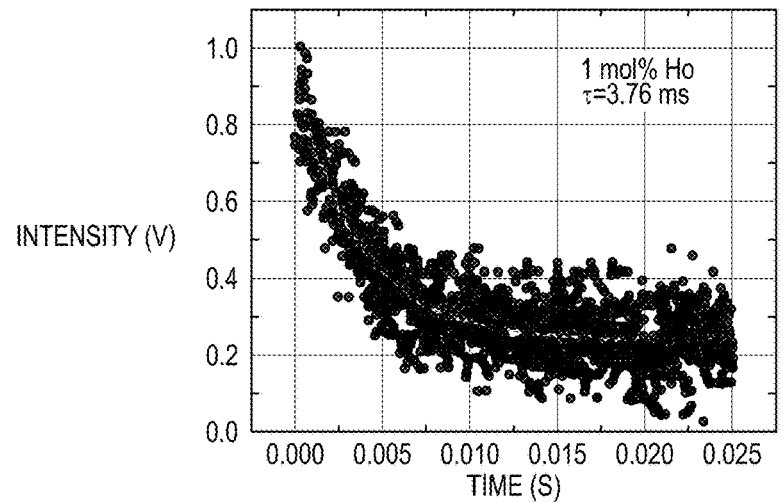
Figure 4B:
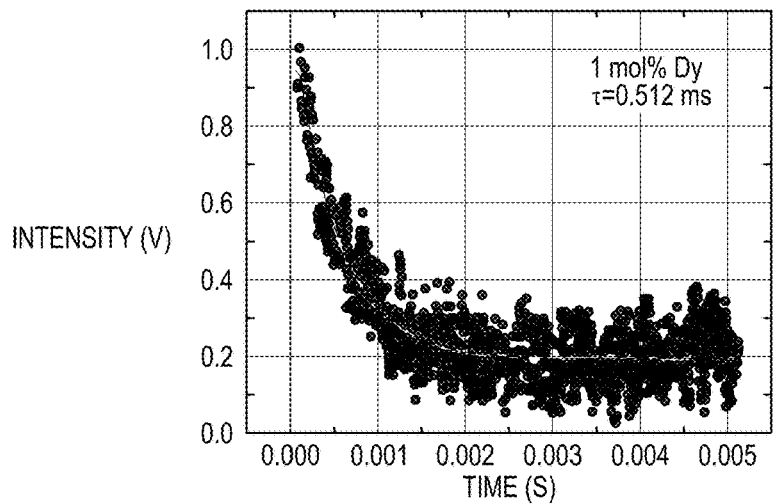
Figure 5A:
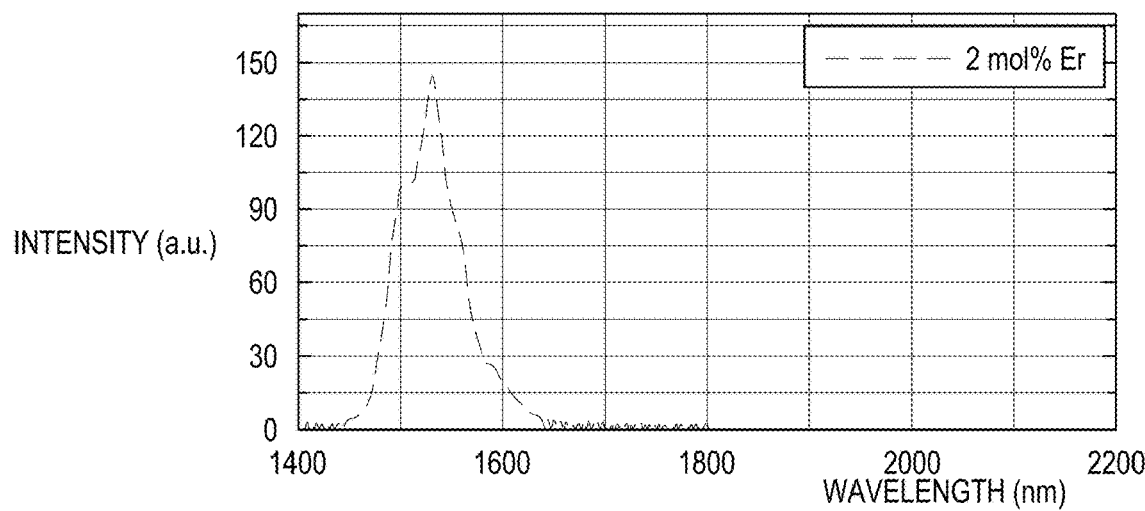
FIG. 5 shows the fluorescence spectra of the 2 mol % $Er^{3+}$-doped, 2 mol % $Er^{3+}$/1 mol % $Ho^{3+}$ co-doped, and 2 mol % $Er^{3+}$/1 mol % $Dy^{3+}$ co-doped ZBLAN glass samples measured at 1400-2200 nm and 2500-3500 nm when they were pumped at 976 nm.
Figure 5B:
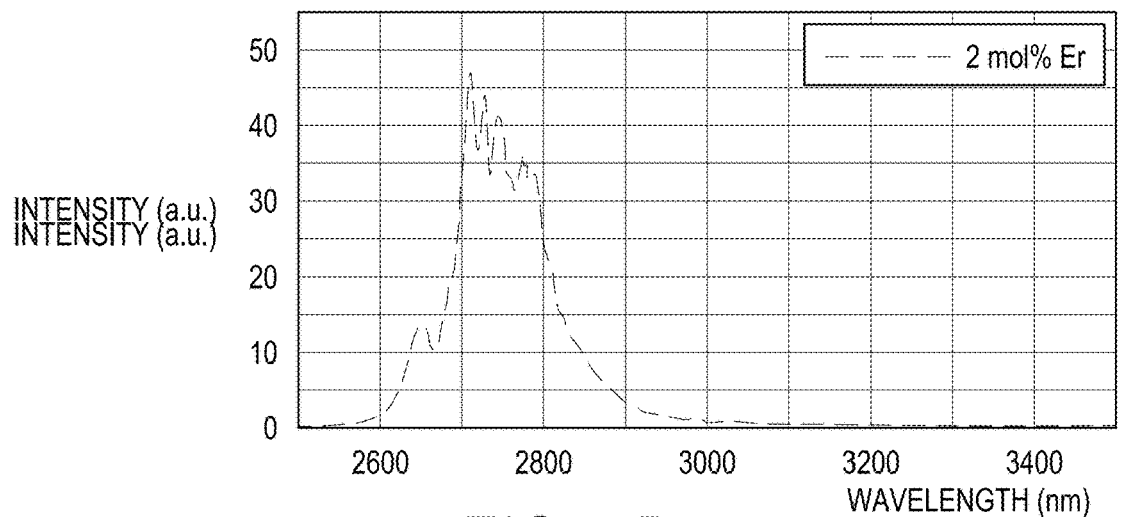
Figure 5C:
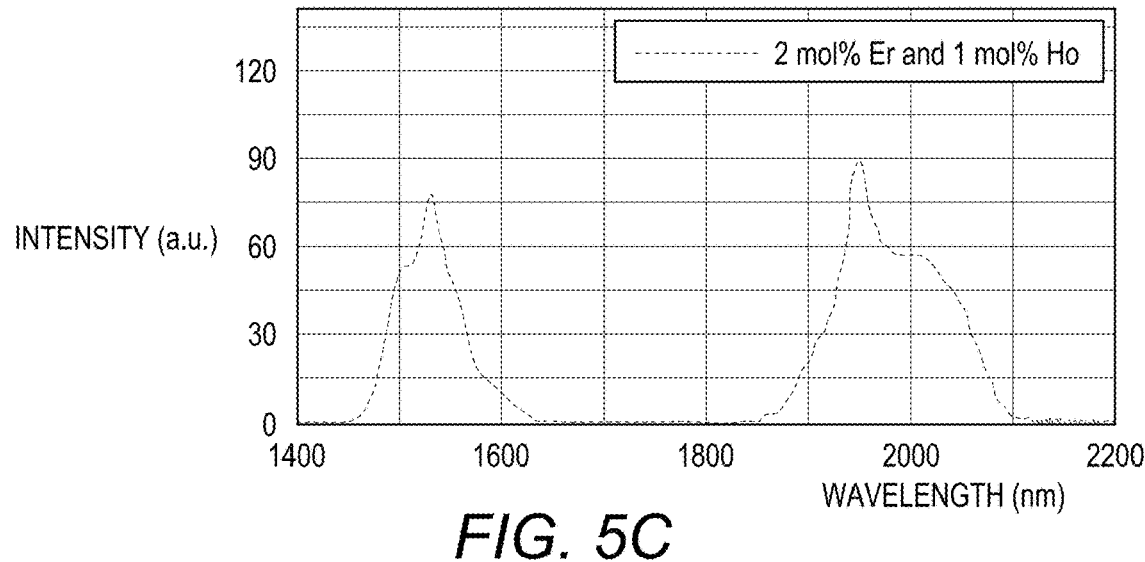
Figure 5D:
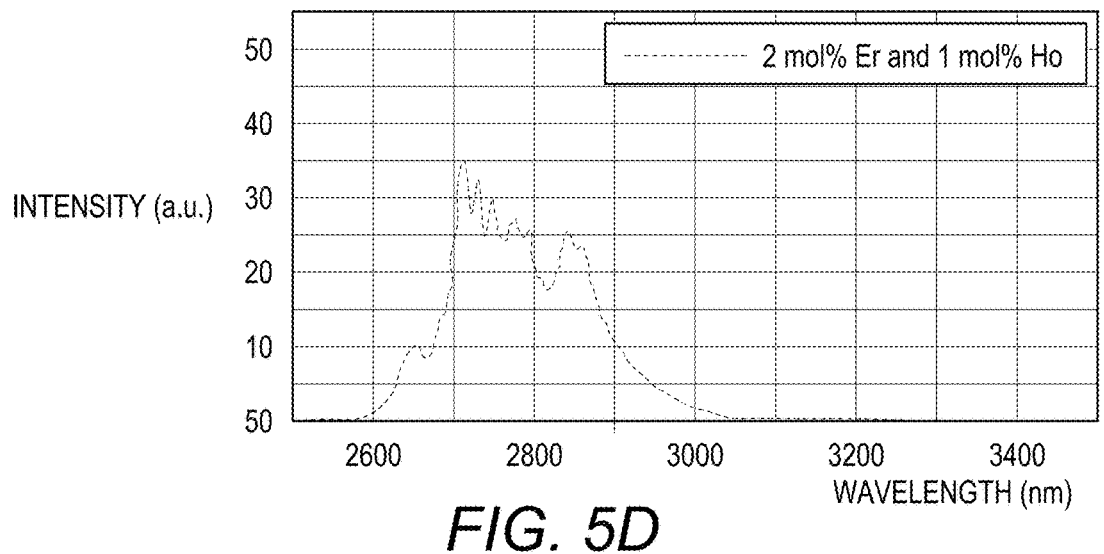
Figure 5E:
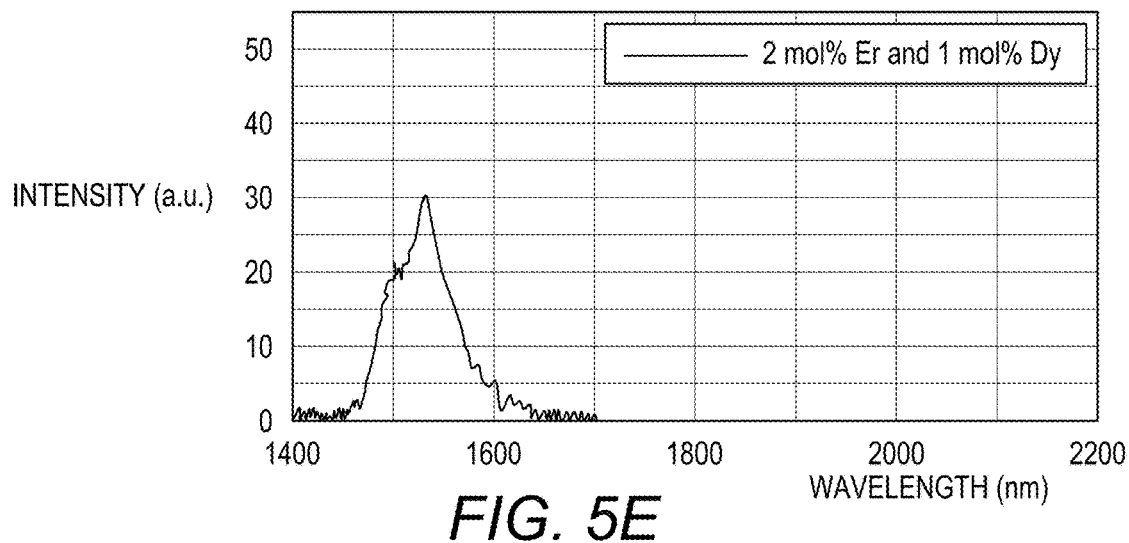
Figure 5F:
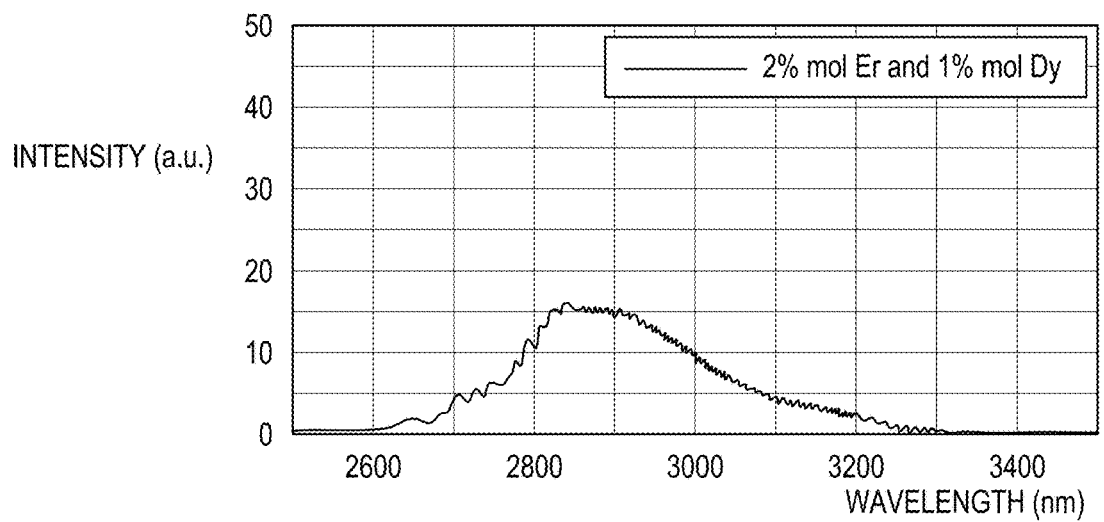

The fluorescence spectra of singly $Er^{3+}$-, $Ho^{3+}$-, and $Dy^{3+}$-doped ZBLAN glass in the 3 μm wavelength region were measured and are shown in FIG. 4(a). Clearly, the $Er^{3+}$-doped ZBLAN has a fluorescence emission covering from 2500 nm to 3000 nm with a peak at 2740 nm. There are small dips on the fluorescence spectrum around 2740 nm that are due to the absorption of the water vapor in the measurement setup. The fluorescence of the $Ho^{3+}$-doped ZBLAN has a peak at 2850 nm and the long wavelength emission extends to 3100 nm. The $Dy^{3+}$-doped ZBLAN has a very broad fluorescence covering from 2600 nm to 3400 nm, which is of great interest for developing ultra-wide wavelength tunable laser source and ultrashort pulse laser source in the 3 μm wavelength region. Most recently, a wavelength-tunable $Dy^{3+}$-doped ZBLAN fiber laser with a tuning range of 2.8-3.4 μm was reported and a mode-locked $Dy^{3+}$-doped fiber laser with a tuning range of 2.9-3.3 μm was demonstrated. The lifetimes of level $^4I_{11/2}$, level $^5I_6$, and level $^6H_{13/2}$ of singly $Er^{3+}$-, $Ho^{3+}$-, and $Dy^{3+}$-doped ZBLAN glass in the 3 μm wavelength region were measured to be 6.9 ms, 3.76 ms, and 0.512 ms, respectively, as shown in FIG. 4(b). Because the lifetimes of level $^5I_6$ and level $^6H_{13/2}$ are smaller than that of level $^4I_{11/2}$, efficient energy transfer from $Er^{3+}$ to $Ho^{3+}$ and $Dy^{3+}$ can occurs in ZBLAN.

As mentioned above, numerous investigations on $Er^{3+}$-doped ZBLAN fiber lasers have been conducted and several ten-watt-level fiber lasers at 2.8 μm have been demonstrated during the last decade due to the readily available high power pump diodes at 980 nm. Therefore, similar progress on $Ho^{3+}$- and $Dy^{3+}$-doped ZBLAN fiber lasers could be achieved if they can be pumped with high power high efficiency diode lasers.

However, high power diode lasers at the absorption peaks of $Ho^{3+}$ and $Dy^{3+}$ are still not available. Therefore, using energy transfer from $Er^{3+}$ to $Ho^{3+}$ and $Dy^{3+}$ could be a promising solution to this problem.

The fluorescence spectra of the 2 mol % $Er^{3+}$, 2 mol % $Er^{3+}$/1 mol % $Dy^{3+}$, and 2 mol % $Er^{3+}$/1 mol % $Ho^{3+}$ doped ZBLAN glass samples pumped with a 976 nm diode laser at a power level of 316 mW were measured at ranges of 1400-2200 nm and 2500-3500 nm and are shown in FIG. 5. FIGS. 5(a) and 5(b) show the fluorescence spectra of the singly $Er^{3+}$-doped ZBLAN glass with peaks at 1540 nm and 2740 nm, corresponding to the transitions of $^4I_{13/2} \rightarrow ^4I_{15/2}$ and $^4I_{11/2} \rightarrow ^4I_{13/2}$, respectively. The fluorescence spectra of the $Er^{3+}/Ho^{3+}$ co-doped ZBLAN glass at near-IR and the 3 μm wavelength region are shown in FIGS. 5(c) and 5(d), respectively. Besides the fluorescence of $Er^{3+}$ at the 1.5 μm wavelength region, the $Er^{3+}/Ho^{3+}$ co-doped ZBLAN glass has fluorescence emission with a peak at 1950 nm, corresponding to the transition from $^5I_7$ to $^5I_8$ of $Ho^{3+}$. Moreover, the fluorescence of the $Er^{3+}/Ho^{3+}$ co-doped ZBLAN glass at the 3 μm wavelength region exhibits the combined features of the fluorescence of singly $Er^{3+}$- and $Ho^{3+}$-doped ZBLAN. Because $Ho^{3+}$ ions don't have absorption at 976 nm, these results clearly prove that energy transfer from level $^4I_{13/2}$ of $Er^{3+}$ to level $^5I_6$ of $Ho^{3+}$ occurs in ZBLAN as illustrated by the $ET_{3-6}$ process in FIG. 2. The fluorescence spectra of the $Er^{3+}/Dy^{3+}$ co-doped ZBLAN glass at the 1.5 μm wavelength region and the 3 μm wavelength region are shown in FIGS. 5(e) and 5(f), respectively. The fluorescence spectrum of the $Er^{3+}/Dy^{3+}$ co-doped ZBLAN at 3 μm is almost the same as that of the singly $Dy^{3+}$-doped ZBLAN, showing that efficient energy transfer from level $^4I_{11/2}$ of $Er^{3+}$ to level $^6F_{9/2}$ of $Dy^{3+}$ occurs as illustrated by the $ET_{3-9}$ process in FIG. 2. The fluorescence of the $Er^{3+}/Dy^{3+}$ co-doped ZBLAN at 1.54 μm, however, is much smaller than that of the singly $Er^{3+}$ doped ZBLAN, also indicating most energy is transferred from $Er^{3+}$ to $Dy^{3+}$.

Figure 6A:
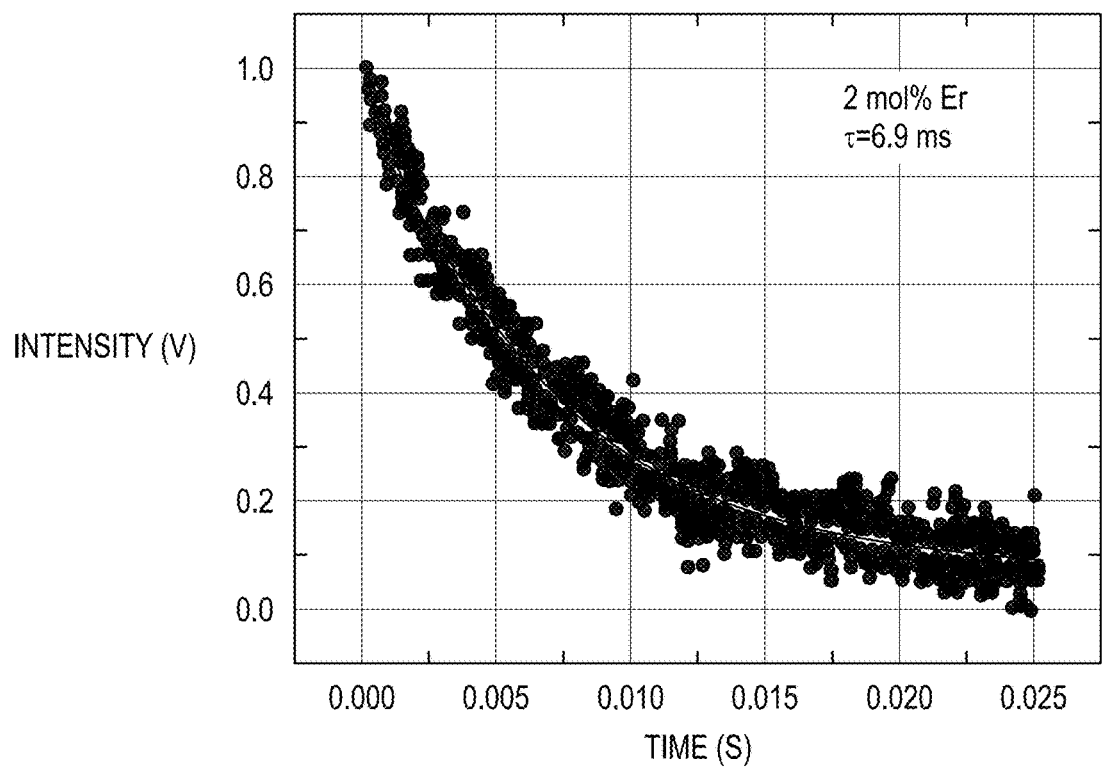
FIGS. 6(a)-6(c) show measured 3 μm fluorescence decay curves and fitting curves of 2 mol % $Er^{3+}$-doped (FIG. 6a), 2 mol % $Er^{3+}$/1 mol % $Ho^{3+}$ co-doped (FIG. 6b), and 2 mol % $Er^{3+}$/1 mol % $Dy^{3+}$ co-doped (FIG. 6c) ZBLAN glasses in the 3 μm wavelength region.
Figure 6B:
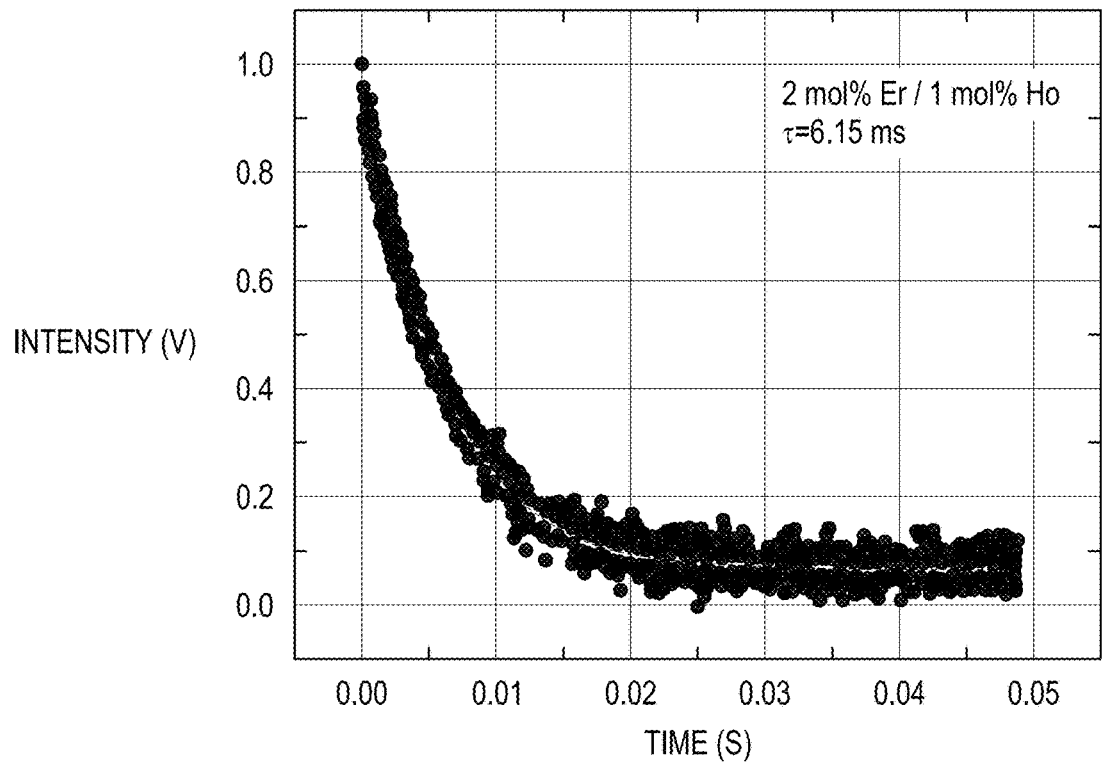
Figure 6C:
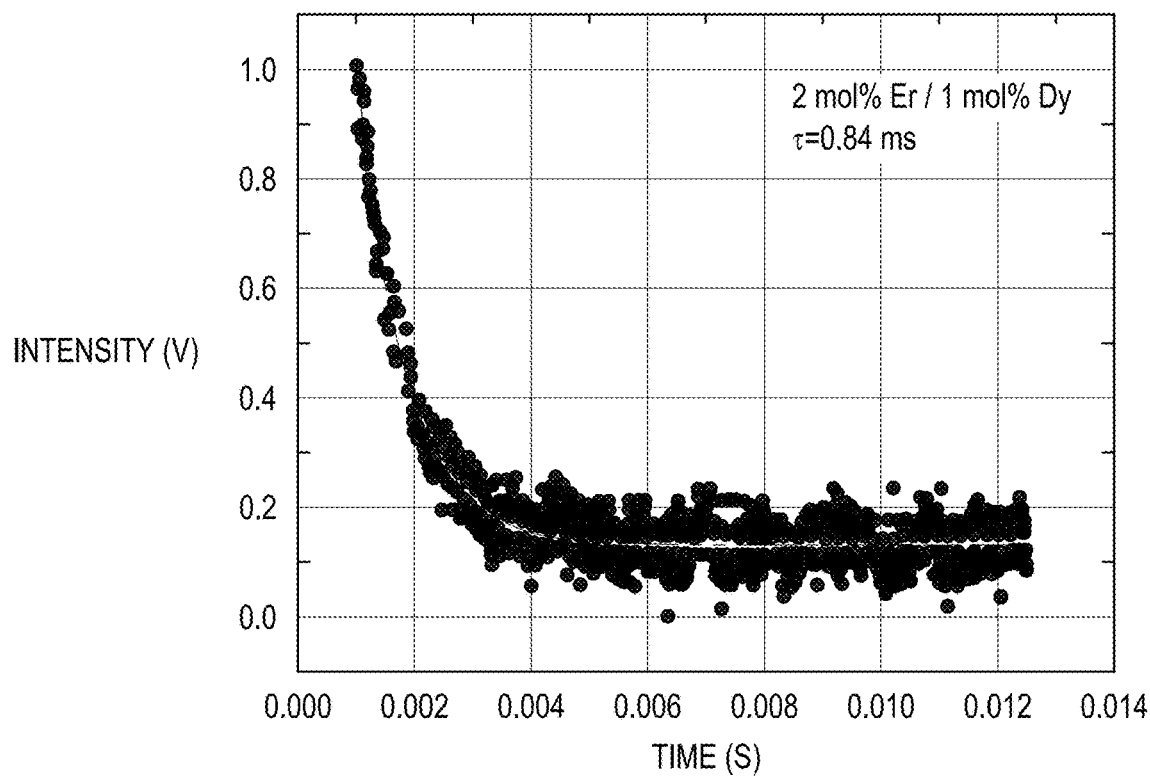

The energy transfer from $Er^{3+}$ to $Ho^{3+}$ and $Dy^{3+}$ was also confirmed by measuring the 3 μm fluorescence decay from level $^4I_{11/2}$ of $Er^{3+}$ in these glass samples using the lifetime measurement setup shown in FIG. 1(b). The glass samples were pumped with 10 ns second pulse laser at 976 nm. The decaying curves of the 3 μm fluorescence were measured by using filters to remove the light below 2.5 μm and are shown in FIG. 6. The decay time of the 3 μm fluorescence of the 2 mol % $Er^{3+}$-doped ZBLAN sample is 6.9 ms, which is consistent with the reported lifetime of level $^4I_{11/2}$ of $Er^{3+}$ in ZBLAN. The decay time of the 3 μm fluorescence of the 2 mol % $Er^{3+}$/1 mol % $Ho^{3+}$ co-doped ZBLAN sample is 6.15 ms, which is smaller than that of the singly $Er^{3+}$-doped ZBLAN, indicating that the energy transfer from $Er^{3+}$ to $Ho^{3+}$ occurs. The decay time of the 3 fluorescence of the 2 mol % $Er^{3+}$/1 mol % $Dy^{3+}$ co-doped ZBLAN sample is only 0.84 ms, which is significantly reduced due to the efficient energy transfer from $Er^{3+}$ to $Dy^{3+}$. It is worth noting that the fluorescence decay times are consistent with the measured fluorescence spectra. In the $Er^{3+}/Ho^{3+}$ co-doped ZBLAN, the energy transfer from $Er^{3+}$ to $Ho^{3+}$ is not very efficient, so the fluorescence decay time is close to the lifetime of level $^4I_{11/2}$ of $Er^{3+}$ and the fluorescence spectrum exhibits the combined features of the fluorescence of $Er^{3+}$ and $Ho^{3+}$. The energy transfer from $Er^{3+}$ to $Dy^{3+}$ is very efficient in the $Er^{3+}/Dy^{3+}$ co-doped ZBLAN, so the fluorescence decay time is close to the lifetime of level $^6H_{13/2}$ of $Dy^{3+}$ and the fluorescence spectrum is almost the same as that of the singly $Dy^{3+}$-doped ZBLAN.

Figure 7A:
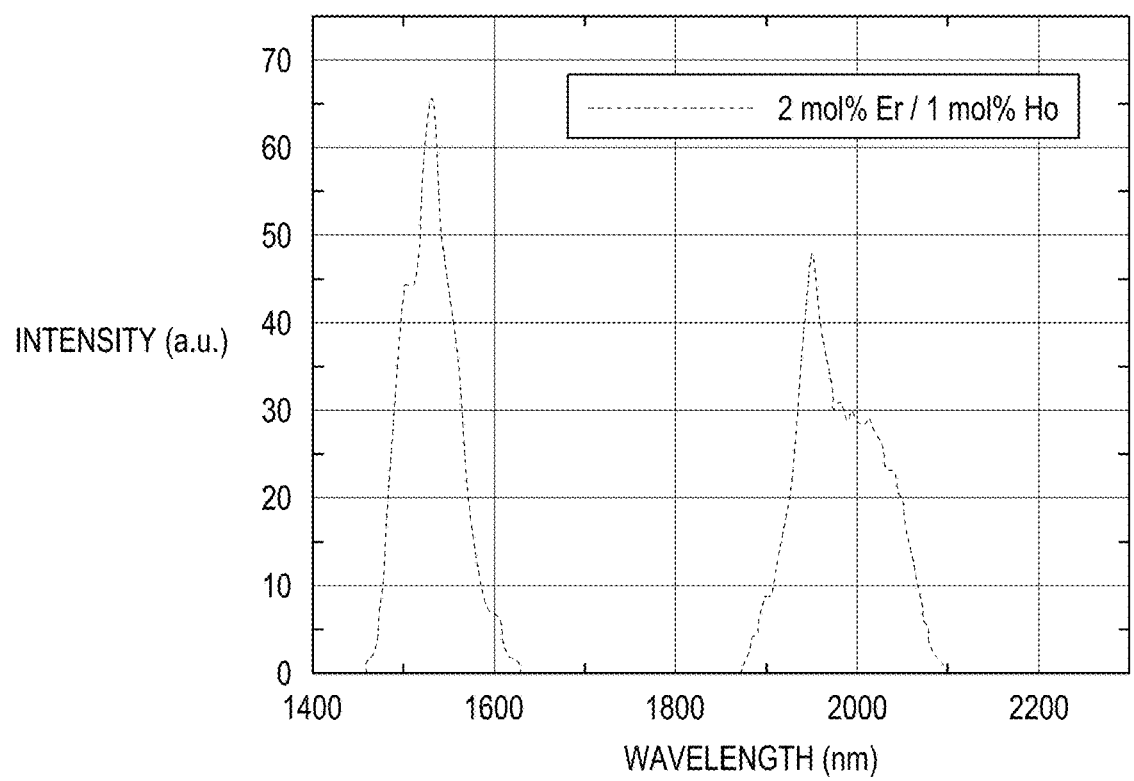
FIG. 7(a) shows the measured fluorescence spectra of $Er^{3+}/Ho^{3+}$ co-doped ZBLAN samples pumped at 1480 nm and FIG. 7(b) shows the measured fluorescence spectra of $Er^{3+}/Dy^{3+}$ co-doped ZBLAN samples pumped at 1480 nm.
Figure 7B:
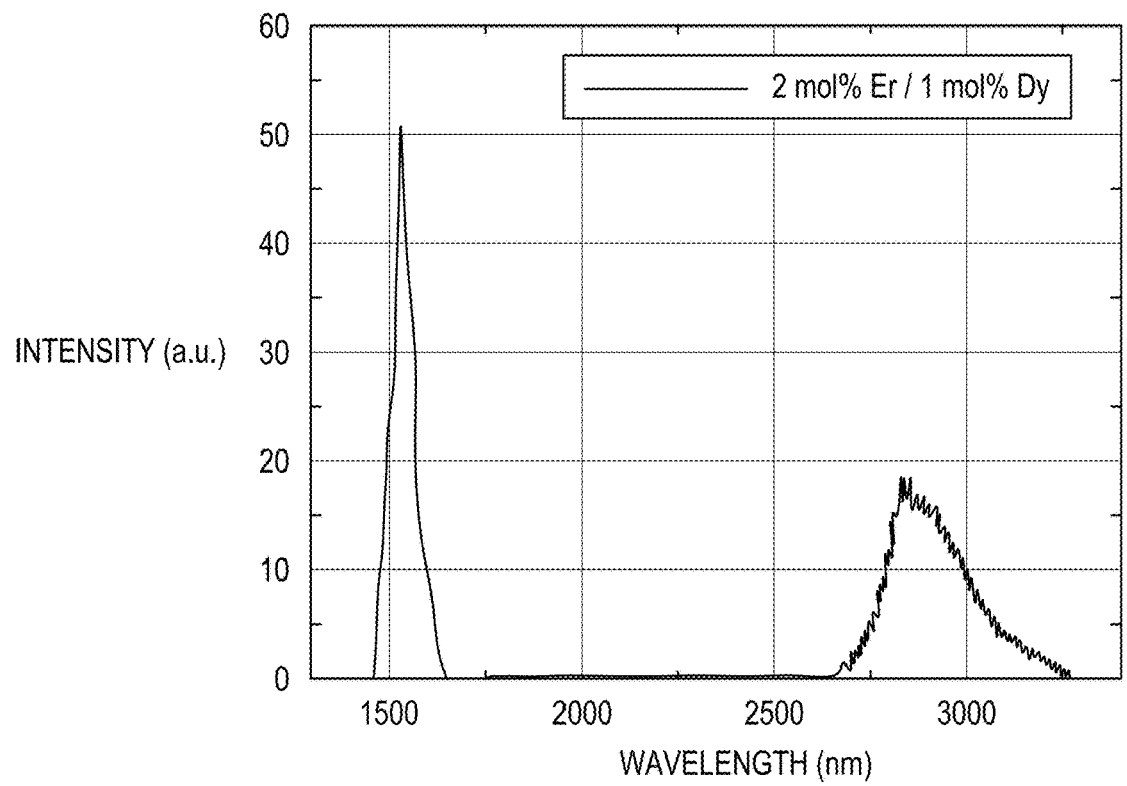
Figure 8A:
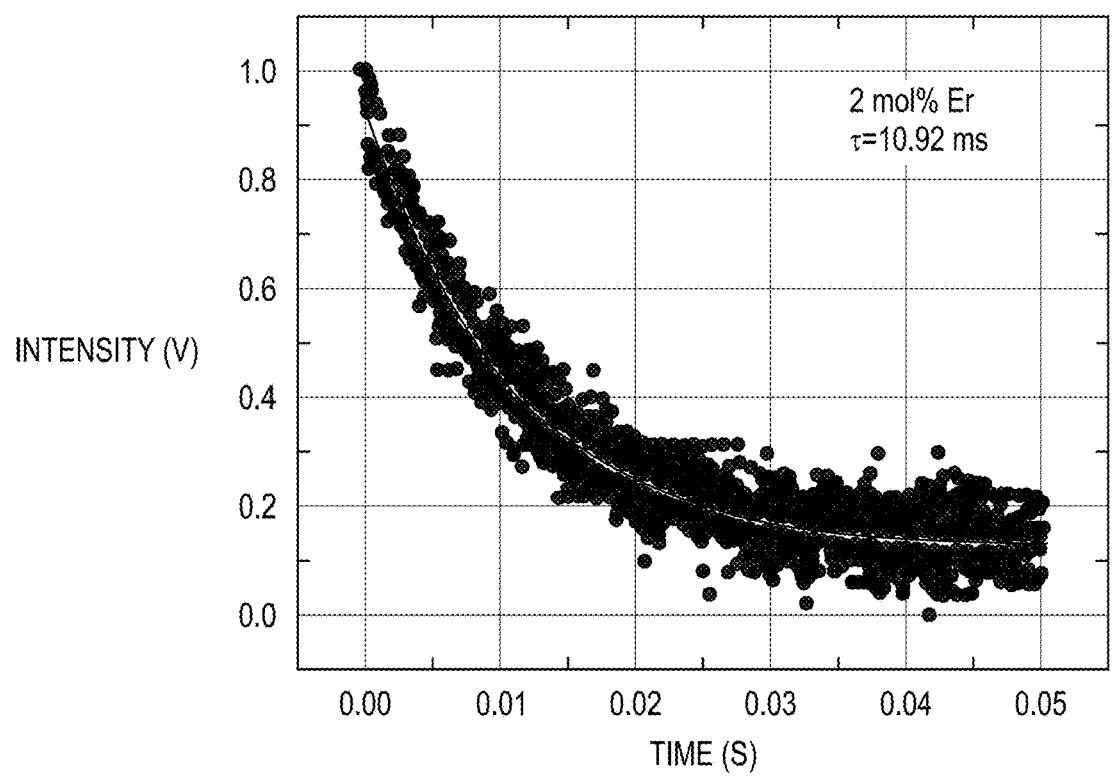
FIGS. 8(a)-8(c) show the measured 1.55 μm fluorescence decay curves and fitting curves of 2 mol % $Er^{3+}$-doped (FIG. 8a), 2 mol % $Er^{3+}$/1 mol % $Ho^{3+}$ co-doped (FIG. 8b), and 2 mol % $Er^{3+}$/1 mol % $Dy^{3+}$ co-doped (FIG. 8c) ZBLAN glasses pumped at 1480 nm.
Figure 8B:
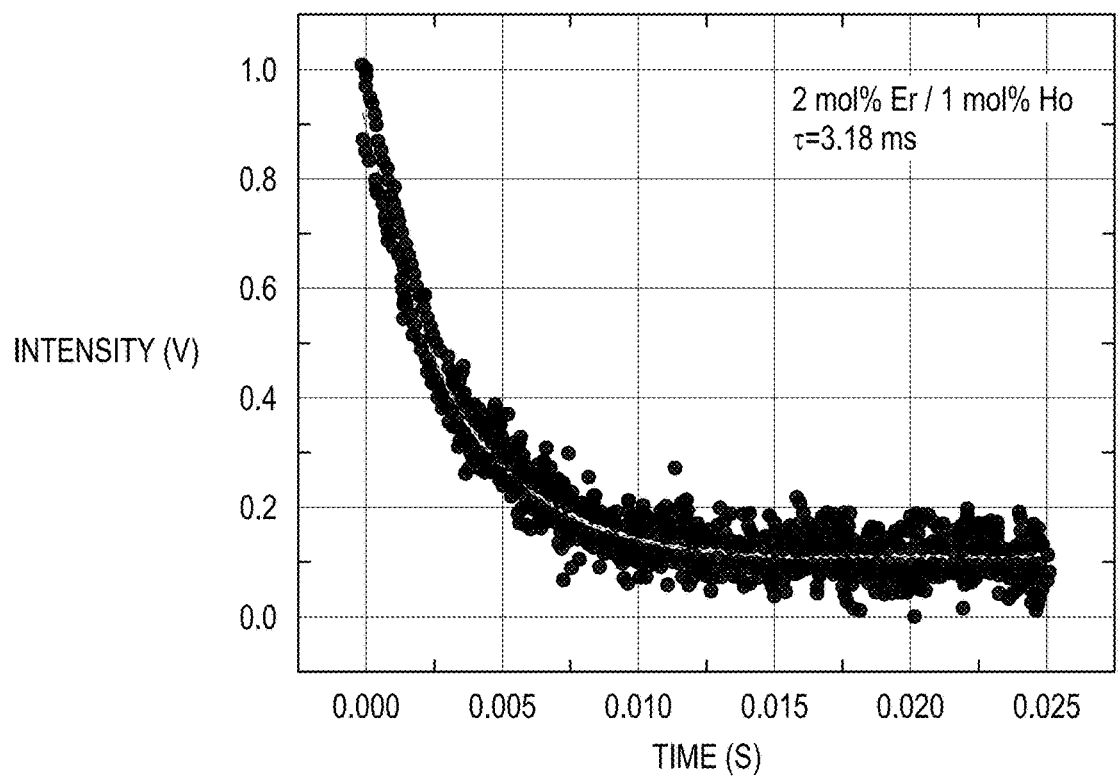
Figure 8C:
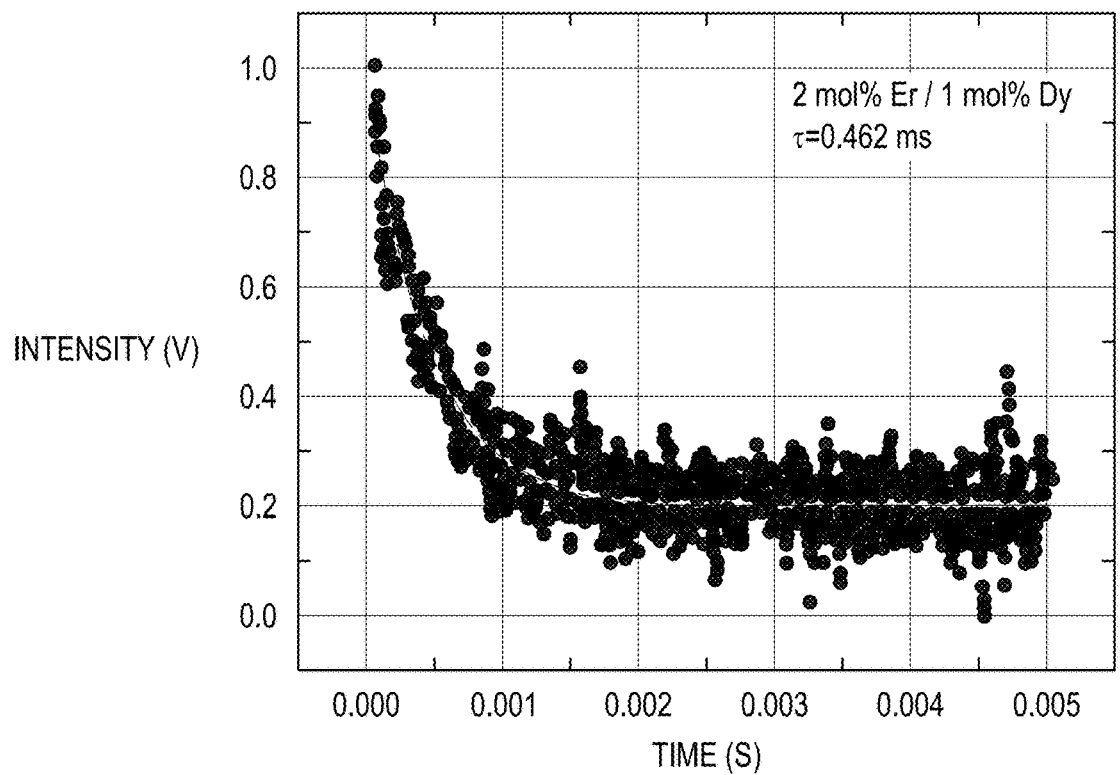

In addition to the energy transfer processes from level $^4I_{11/2}$ of $Er^{3+}$ to $Ho^{3+}$ and $Dy^{3+}$ ($ET_{3-6}$ and $ET_{3-9}$ processes in FIG. 2), the energy transfer processes from level $^4I_{13/2}$ of $Er^{3+}$ to level $^5I_7$ of $Ho^{3+}$ ($ET_{2-5}$ process in FIG. 2) and level $^6H_{11/2}$ of $Dy^{3+}$ ($ET_{2-8}$ process in FIG. 2) also occur in the co-doped ZBLANs and were confirmed by the measured fluorescence spectra and the reduced lifetime of level $^4I_{13/2}$ of $Er^{3+}$ when they were pumped at 1480 nm. The fluorescence of $Er^{3+}/Ho^{3+}$ co-doped ZBLAN sample pumped by a 1480 nm diode laser was measured and is shown in FIG. 7(a). Besides the fluorescence of $Er^{3+}$ at the 1.55 µm wavelength region, the fluorescence of $Ho^{3+}$ with a peak at 1950 nm was also measured although $Ho^{3+}$ ions don't have any absorption at 1480 nm, indicating that energy transfer from $^4I_{13/2}$ of $Er^{3+}$ to level $^5I_7$ of $Ho^{3+}$ occurs. FIG. 7(b) shows the fluorescence of $Er^{3+}/Dy^{3+}$ co-doped ZBLAN sample pumped by a 1480 nm diode laser. Besides the fluorescence of $Er^{3+}$ at the 1.55 µm wavelength region, the fluorescence of $Dy^{3+}$ with a peak at 2850 nm was also measured, confirming the energy transfer from level $^4I_{13/2}$ of $Er^{3+}$ to level $^6H_{11/2}$ of $Dy^{3+}$. The 1.55 µm fluorescence decay curves of the three ZBLAN glass samples pumped at 1480 nm were also measured and are shown in FIG. 8. The lifetime of level $^4I_{13/2}$ of the $Er^{3+}/Ho^{3+}$ co-doped ZBLAN was calculated to be 3.18 ms and that of the Er/Dy co-doped ZBLAN was calculated to 0.462 ms. Both lifetimes are smaller than that of the singly $Er^{3+}$-doped ZBLAN (10.92 ms), again proving the efficient energy transfer from level $^4I_{13/2}$ of $Er^{3+}$ to level $^5I_7$ of $Ho^{3+}$ and level $^6H_{11/2}$ of $Dy^{3+}$, respectively.

Figure 9A:
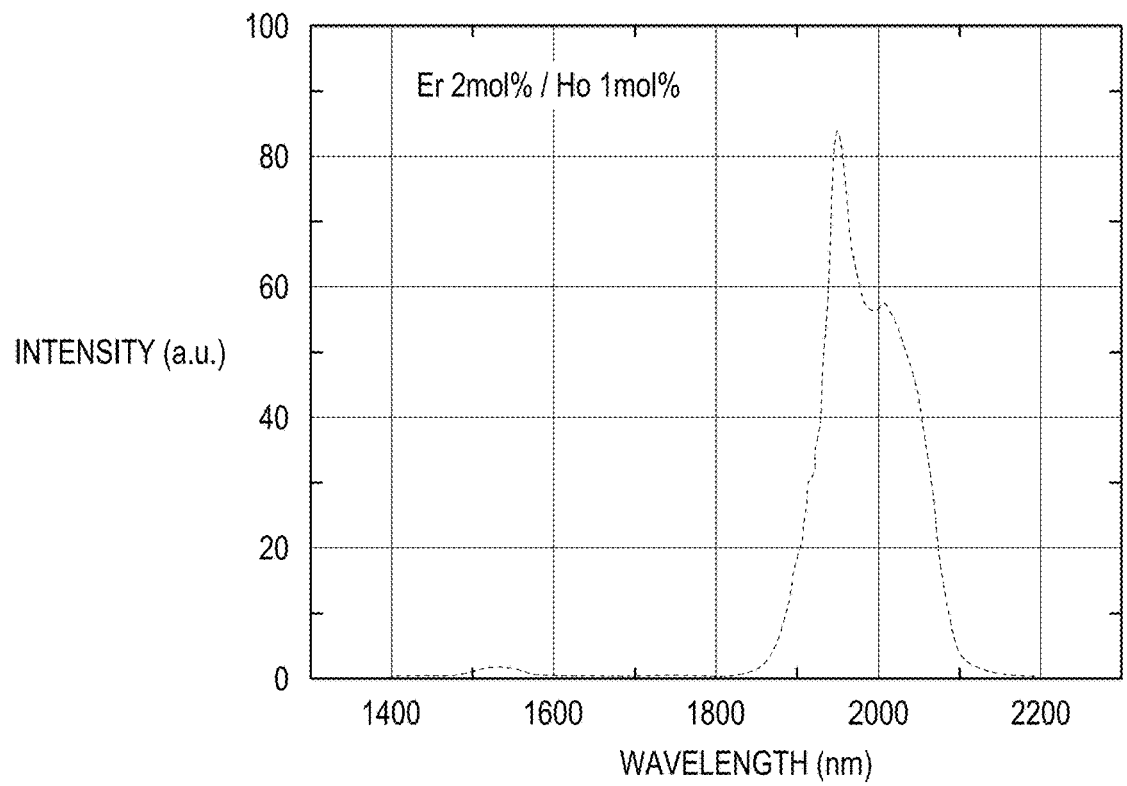
FIG. 9(a) shows the fluorescence spectrum of 2 mol % $Er^{3+}$/1 mol % $Ho^{3+}$ co-doped ZBLAN pumped at 1150 nm measured at 1400-2200 nm and FIG. 9(b) shows the fluorescence spectrum of 2 mol % $Er^{3+}$/1 mol % $Dy^{3+}$ co-doped ZBLAN pumped at 1090 nm measured at 1000-2000 nm.
Figure 9B:
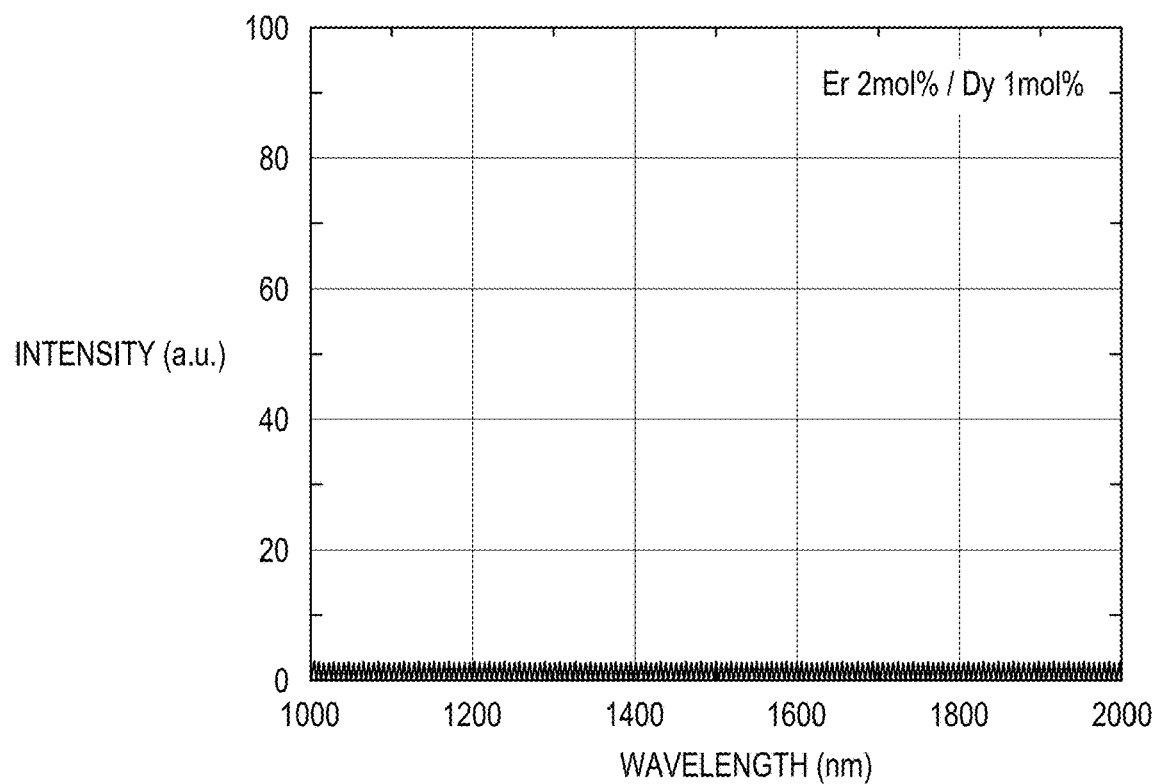

The backward energy transfer from $Dy^{3+}$ and $Ho^{3+}$ to $Er^{3+}$ was also investigated in our experiment. The fluorescence spectrum of the $Er^{3+}/Ho^{3+}$ co-doped ZBLAN sample pumped at 1150 nm was measured at 1400-2200 nm and is shown in FIG. 9(a). In addition to the 2 µm emission from $Ho^{3+}$, a very weak fluorescence at 1.55 µm from $Er^{3+}$ was measured and is shown in FIG. 9(a), indicating that the backward energy transfer from $Ho^{3+}$ to $Er^{3+}$ occurs but the energy transfer probability is very low. The fluorescence spectrum of the $Er^{3+}/Dy^{3+}$ co-doped ZBLAN sample pumped at 1090 nm was measured at 1400-2200 nm and is shown in FIG. 9(b). The fluorescence at 1.55 µm from $Er^{3+}$ was not measured, indicating that the backward energy transfer from $Dy^{3+}$ to $Er^{3+}$ is negligible.

The parameters of the energy transfer processes ($k_{25}$, $k_{36}$, $k_{28}$, $k_{39}$) can be obtained by solving the rate equations for $Er^{3+}/Dy^{3+}$ and $Er^{3+}/Ho^{3+}$ co-doped ZBLAN to calculate the populations on the energy levels and fitting the measured fluorescence spectra. The rate equations for $Er^{3+}/Ho^{3+}$ co-doped ZBLAN pumped at 976 nm can be written as follows.

$$dN_3/dt = R_{13}N_1 - A_{31}N_3 - A_{32}N_3 - k_{36}N_3^2 = 0 \quad (1)$$

$$dN_2/dt = A_{32}N_3 - A_{21}N_2 - k_{25}N_2^2 = 0 \quad (2)$$

$$dN_1/dt = -R_{123}N_1 + A_{31}N_3 + A_{21}N_2 + k_{36}N_3^2 + k_{25}N_2^2 = 0 \quad (3)$$

$$N_1 + N_2 + N_3 - N_{er} = 0 \quad (4)$$

$$dN_6/dt = k_{36}N_3N_4 - A_{64}N_6 - A_{65}N_6 = 0 \quad (5)$$

$$dN_5/dt = k_{25}N_2N_4 + A_{65}N_6 - A_{54}N_5 = 0 \quad (6)$$

$$dN_4/dt = -k_{25}N_2N_4 - k_{36}N_3N_4 + A_{64}N_6 + A_{54}N_5 = 0 \quad (7)$$

$$N_4 + N_5 + N_6 - N_{Ho} = 0 \quad (8)$$

Where, $N_i$ is the population on the corresponding energy level of $Er^{3+}$ and $Ho^{3+}$ shown in FIG. 2; $R_{13} = (\sigma_{abs}P_p)/(hv_pA_{eff})$ is the pump rate, $\sigma_{abs}$ is the absorption cross-section of $Er^{3+}$, which is $2 \times 10^{-25}$ m$^2$ at 976 nm, $P_p$ is the laser pump power, $A_{eff}$ is the effective area of the pump spot, h is the plank constant, and v is the frequency of the pump; $A_{ij}$ is the transition rate of the spontaneous emission from level i to level j (the values of $A_{ij}$s can be found in W. Xin, L. Zhilan, L. Kefeng, Z. Lei, C. Jimeng, H. Lili, "Spectroscopic properties and energy transfer in Er—Tm co-doped bismuth silicate glass." Optical Materials 35 (12), 2290-2295 (2013)) and $k_{ij}$ is the parameter for the energy transfer process from level i to level j between $Er^{3+}$ and $Ho^{3+}$.

Figure 10A:
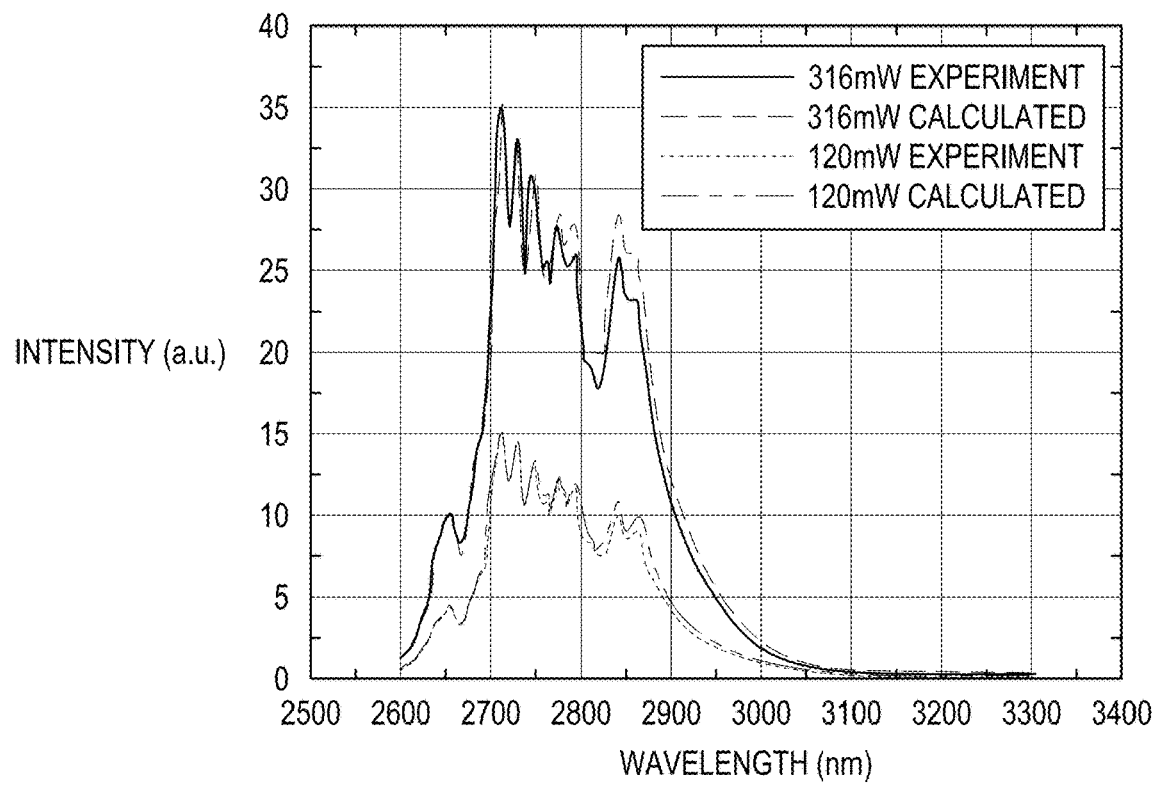
FIGS. 10(a)-10(b) show the measured 3 μm fluorescence spectra and their fitting curves for $Er^{3+}$/$Ho^{3+}$ co-doped ZBLAN (FIG. 10a) and $Er^{3+}$/$Dy^{3+}$ co-doped ZBLAN (FIG. 10b) pumped with 120 mW and 316 mW 976 nm lasers.

FIG. 10(a) shows the measured 3 µm fluorescence spectra of the $Er^{3+}/Ho^{3+}$ co-doped ZBLANs pumped by the 976 nm diode laser at 120 mW and 316 mW and their fitting curves. The parameters $k_{36}$ and $k_{25}$ were calculated to be $1.56 \times 10^{16}$ cm$^3$/s and $1.53 \times 10^{17}$ cm$^3$/s, respectively, by fitting the fluorescence spectra of the $Er^{3+}/Ho^{3+}$ co-doped ZBLANs with the fluorescence spectra of the singly $Er^{3+}$- and $Ho^{3+}$-doped ZBLANs. Clearly, the energy transfer rate from level $^4I_{11/2}$ of $Er^{3+}$ to level $^5I_6$ of $Ho^{3+}$ is one order of magnitude larger than that from level $^4I_{13/2}$ of $Er^{3+}$ to level $^5I_7$ of $Ho^{3+}$. It should be noted that, the parameter $k_{25}$ can be also obtained by fitting the fluorescence spectrum of the $Er^{3+}/Ho^{3+}$ co-doped ZBLAN pumped at 1480 nm that is shown in FIG. 7(a).

The rate equations for $Er^{3+}/Dy^{3+}$ co-doped ZBLAN pumped at 976 nm can be written as follows.

$$dN_3/dt = R_{13}N_1 - A_{31}N_3 - A_{32}N_3 - k_{39}N_3^2 = 0 \quad (9)$$

$$dN_2/dt = A_{32}N_3 - A_{21}N_2 - k_{28}N_2^2 = 0 \quad (10)$$

$$dN_1/dt = -R_{13}N_1 + A_{31}N_3 + A_{21}N_2 + k_{39}N_3^2 + k_{28}N_2^2 = 0 \quad (11)$$

$$N_1 + N_2 + N_3 - N_{er} = 0 \quad (12)$$

$$dN_8/dt = k_{39}N_3N_7 + k_{28}N_2N_7 - A_{87}N_8 = 0 \quad (13)$$

$$N_7 + N_8 - N_{Dy} = 0 \quad (14)$$

Figure 10B:
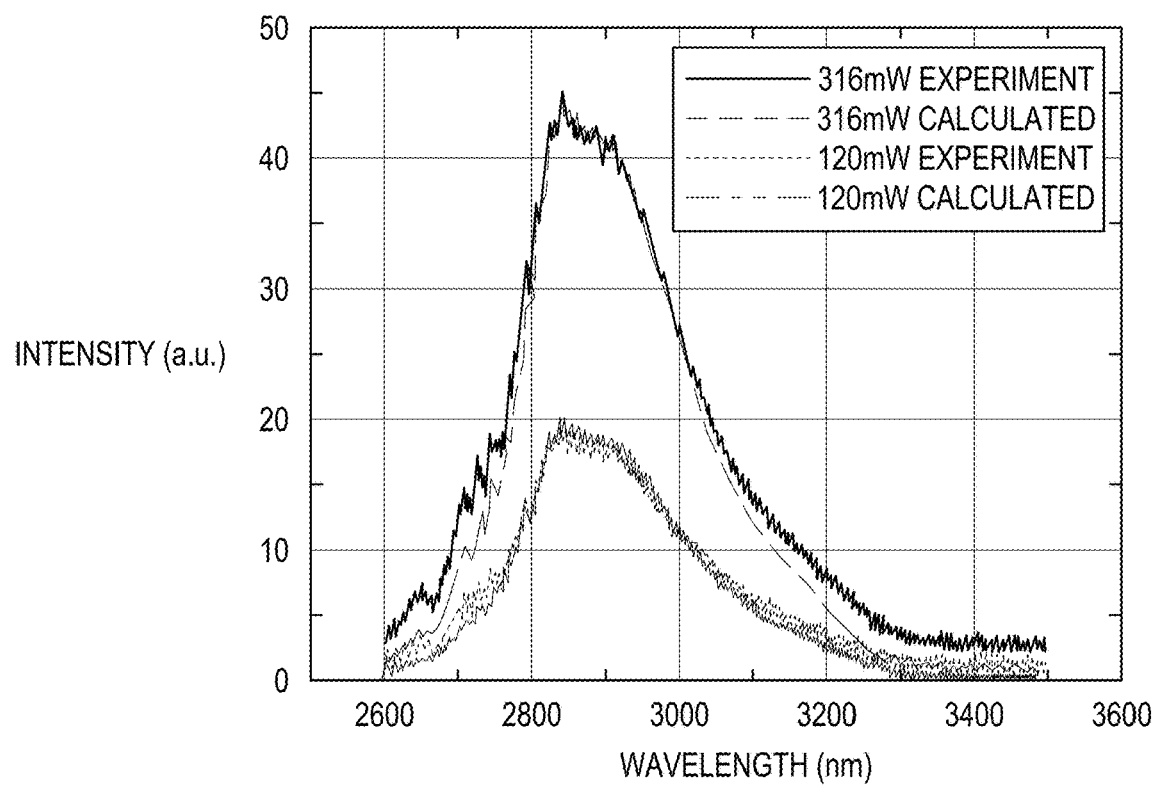

The 3 µm fluorescence spectra of the $Er^{3+}/Dy^{3+}$ co-doped ZBLAN pumped with the 976 nm diode laser at 120 mW and 316 mW and their fitting curves are shown in FIG. 10(b). The parameters $k_{28}$ and $k_{39}$ were calculated to be $9.30 \times 10^{-16}$ cm$^3$/s and $5.75 \times 10^{-15}$ cm$^3$/s, respectively, by fitting the fluorescence spectra of the $Er^{3+}/Dy^{3+}$ co-doped ZBLANs with the fluorescence spectra of the singly $Er^{3+}$- and $Dy^{3+}$-doped ZBLANs. Clearly, the energy transfer rates from $Er^{3+}$ to $Dy^{3+}$ are much larger than that from $Er^{3+}$ to $Ho^{3+}$. This is consistent with the fluorescence and lifetime measurement results. The parameter $k_{28}$ of $9.30 \times 10^{-16}$ cm$^3$/s was also obtained by fitting the fluorescence spectrum of the $Er^{3+}/Dy^{3+}$ co-doped ZBLAN pumped at 1480 nm shown in FIG. 7(b).

In summary, spectroscopic properties of $Er^{3+}$-, $Ho^{3+}$-, $Dy^{3+}$-, $Er^{3+}/Ho^{3+}$-, and $Er^{3+}/Dy^{3+}$-doped ZBLAN glasses were studied and energy transfer from $Er^{3+}$ to $Ho^{3+}$ and $Dy^{3+}$ ions in ZBLAN were confirmed by the experimental results. The parameters for energy transfer processes from level $^4I_{13/2}$ of $Er^{3+}$ to level $^5I_7$ of $Ho^{3+}$ and level $^6I_{13/2}$ of $Dy^{3+}$ were estimated to be $1.56 \times 10^{-16}$ cm$^3$/s and $5.75 \times 10^{-15}$ cm$^3$/s, respectively.

A variety of different laser systems may be formed using the co-doped ZBLAN glasses described herein. The co-doped glasses can be used to develop lasers in most forms such as fiber lasers, rod laser, thin-disk laser, thin-slab lasers, etc. In general, such a laser system includes a gain medium such as an optical fiber in which an optical resonator is defined. The gain medium is co-doped with first and second active elements, the first active element being $Er^{3+}$ and the second active element being $Ho^{3+}$ or $Dy^{3+}$. A pump source is coupled to the gain medium for pumping the gain medium with pump light at the absorption peaks of $Er^{3+}$.

The gain medium includes a host material in which the first and second active elements are doped. While in the embodiments described above, the host material is ZBLAN, in other embodiments alternative metal fluoride glasses may be employed. Moreover, in yet other alternative embodiments, instead of a metal fluoride glass the host material be a fluoride crystal or a chalcogenide glass.

The optical resonator may be defined in the gain medium in any suitable manner using a pair of reflective elements. For instance, in the case of an optical fiber, the reflective elements may be distributed Bragg gratings formed in the optical fiber.

In some embodiments the optical fiber includes a core and at least one cladding, with the first and second active elements being located in the core. In some cases the optical fiber may be a double-cladding fiber (DCF).

In various embodiments the laser system may be arranged so that it is operable in a continuous wave (CW) mode or in a pulsed mode.

In some embodiments the gain medium can be used for fluorescence and amplified spontaneous emission light sources.

Example

One example of a laser that may be formed using the co-doped ZBLAN glasses described herein will be presented below. In particular, $Dy^{3+}/Er^{3+}$ codoped ZBLAN fiber lasers have been fabricated, which are pumped at the $Er^{3+}$ absorption peak at 976 nm, where low-cost high-power high-efficiency pump diodes are readily available. An output power of 260 mW was obtained with 1-m $Dy^{3+}/Er^{3+}$ codoped ZBLAN fiber at a pump power of 7.5 W.

Figure 11A:
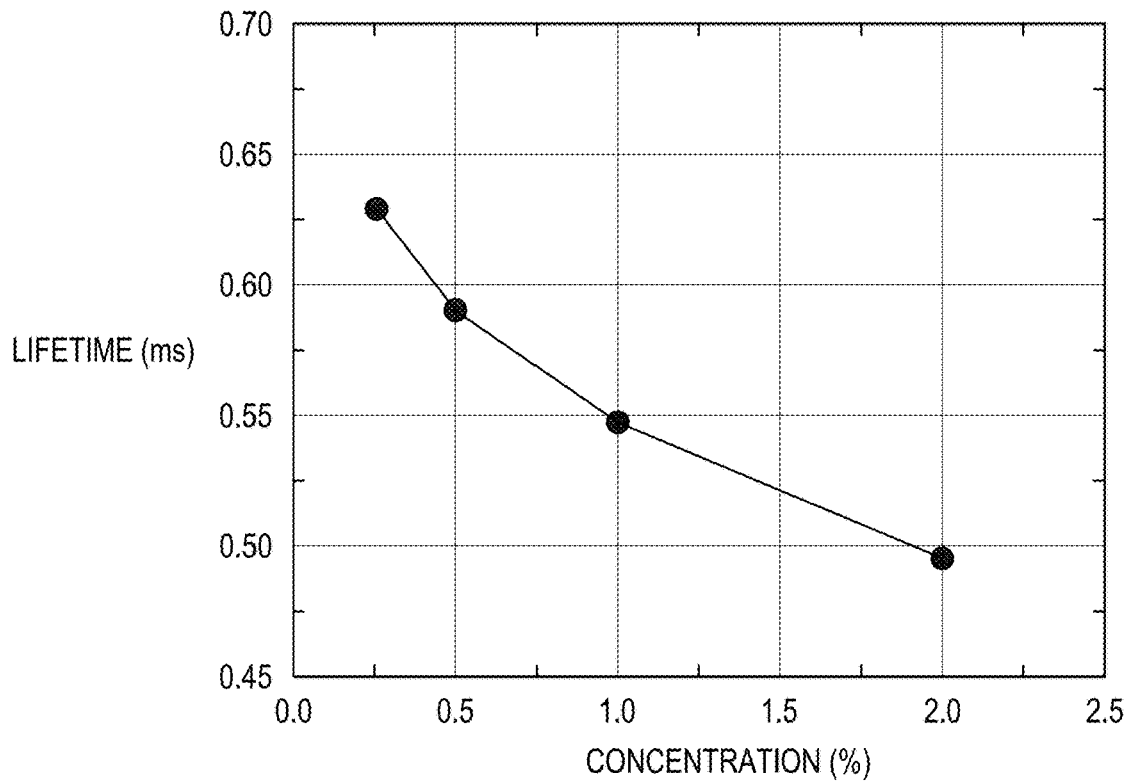
FIG. 11(a) shows the measured lifetimes of level $^6H_{13/2}$ for different concentration $Dy^{3+}$-doped ZBLANs.
Figure 11B:
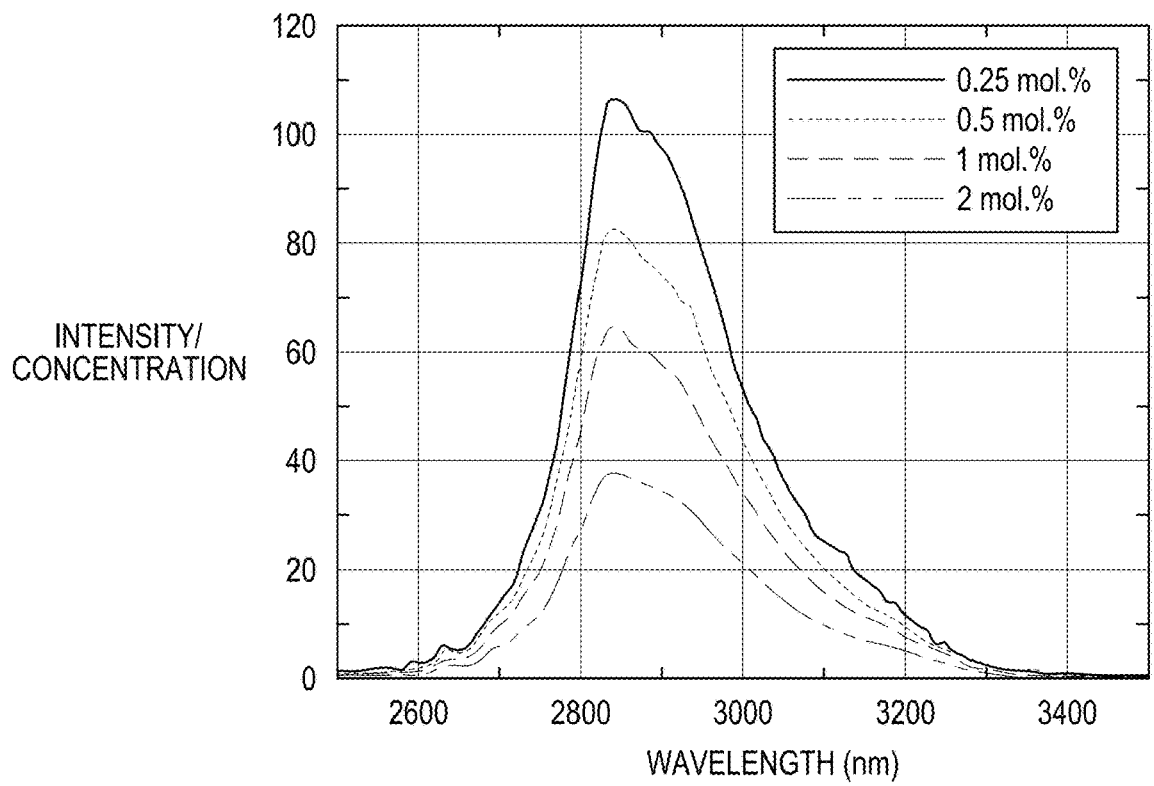
FIG. 11(b) shows fluorescence spectra of different concentration of $Dy^{3+}$-doped ZBLANs normalized to the $Dy^{3+}$ concentrations.

To design a $Dy^{3+}/Er^{3+}$ codoped fiber that can be used to achieve 3-μm fiber lasers pumped by 976 nm laser diode, the spectroscopic properties of singly $Dy^{3+}$-doped and $Dy^{3+}/Er^{3+}$ codoped ZBLAN glass samples with different concentrations was studied. The lifetimes of state $^6H_{13/2}$ of 0.25 mol. %, 0.5 mol. %, 1 mol. %, and 2 mol. % Dy-doped ZBLAN were obtained by measuring the fluorescence decay and are shown in FIG. 11(a). The lifetime of state $^6H_{13/2}$ decreases from 0.63 ms to 0.5 ms as the $Dy^{3+}$ concentration increases from 0.25 mol. % to 2 mol. % due to the concentration quenching effect. The fluorescence spectra of the four singly $Dy^{3+}$-doped ZBLAN glass samples pumped with a 1090 nm laser at a same pump power were measured. The fluorescence spectra normalized by the $Dy^{3+}$ concentration is shown in FIG. 11(b). It is clear that fluorescence emission efficiency decreases with the increasing $Dy^{3+}$ doping level, which is another manifestation of concentration quenching effect. Therefore, lower $Dy^{3+}$ concentration could result in more efficient laser emission at 3 μm.

Figure 12A:
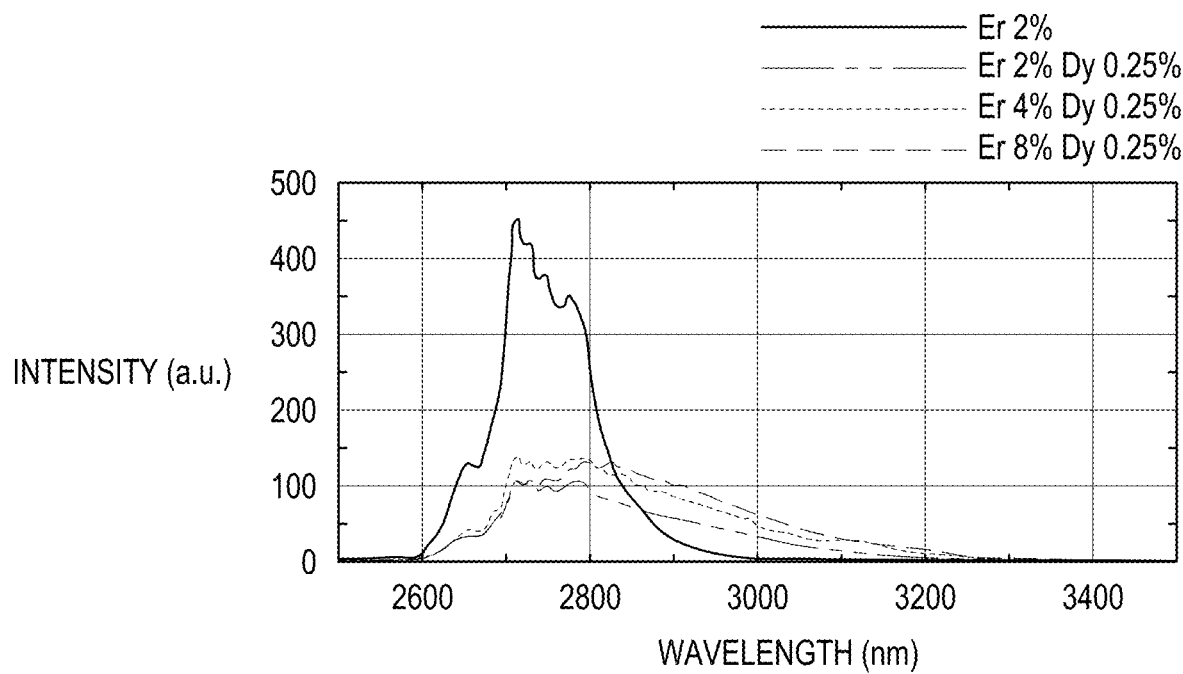
FIGS. 12(a)-12(b) show the measured fluorescence spectra of 2 mol % singly $Er^{3+}$-doped ZBLAN and 0.25 mol % $Dy^{3+}$-doped ZBLAN synthesized with different $Er^{3+}$ concentrations (FIG. 12a) and 4 mol. % $Er^{3+}$-doped ZBLAN synthesized with different $Dy^{3+}$ concentrations (FIG. 12b).

The fluorescence spectra of 0.25 mol. % $Dy^{3+}$-doped ZBLAN synthesized with 2 mol. %, 4 mol. %, and 8 mol. % $Er^{3+}$ ions were measured with monochromator and are shown in FIG. 12(a). As a comparison, the fluorescence spectrum of 2 mol. % Er-doped ZBLAN is also plotted. The four ZBLAN glass samples were pumped with a 976 nm diode laser at a same pump power. It is clear that the $Dy^{3+}/Er^{3+}$ codoped ZBLAN glass samples emit ultra-broad band fluorescence extending to 3.4 μm due to the efficient energy transfer from $Er^{3+}$ to $Dy^{3+}$. The fluorescence intensity of the glass sample synthesized with 4 mol. % $Er^{3+}$ is much larger than that of the glass sample synthesized with 2 mol. % $Er^{3+}$. However, the fluorescence intensity of the glass sample synthesized with 8 mol. % $Er^{3+}$ is comparable to that of the glass sample synthesized with 4 mol. % $Er^{3+}$ although the absorbed pump power is doubled. Moreover, the fluorescence of the glass synthesized with 8 mol. % $Er^{3+}$ at 2.7-2.8 μm is even smaller than that of the glass sample synthesized with 4 mol. % $Er^{3+}$ due to the concentration effect of $Er^{3+}$.

Figure 12B:
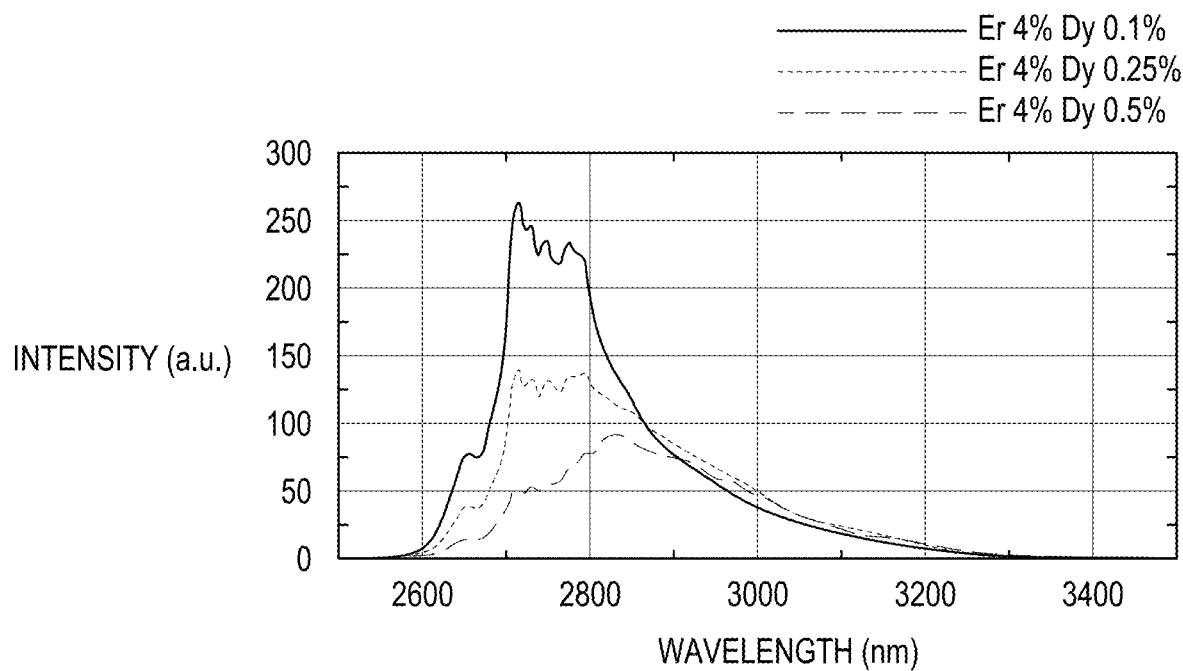

The fluorescence spectra of 0.1 mol. %, 0.25 mol. % and 0.5 mol. % $Dy^{3+}$-doped ZBLAN synthesized with 4 mol. % $Er^{3+}$ ions were also measured at the same pump power at 976 nm and are shown in FIG. 12(b). The fluorescence of the 0.1 mol. % $Dy^{3+}$/4 mol. % $Er^{3+}$ codoped glass sample exhibits high intensity at 2.7-2.8 μm, indicating that energy transfer from $Er^{3+}$ to $Dy^{3+}$ does not take place efficiently. As the $Dy^{3+}$ concentration increases to 0.25 mol. %, the fluorescence intensity at 2.7-2.8 μm decreases significantly while the fluorescence intensity beyond 2.9 μm increases. As the $Dy^{3+}$ concentration increases to 0.5 mol. %, the fluorescence intensity at 2.7-2.8 μm further decreases with a large magnitude but the fluorescence intensity beyond 2.9 μm does not increase due to the concentration quenching effect of $Dy^{3+}$ ions.

The fluorescence results shown in FIG. 12 tell us that low $Dy^{3+}$ concentration could lead to low energy transfer efficiency while high $Dy^{3+}$ concentration could lead to strong quenching effects. Therefore, a good compromise between energy transfer and concentration quenching needs to be engaged in the fiber design for an efficient Dy/Er codoped ZBLAN fiber laser. Based on the spectroscopic study, we selected 0.25 mol. % $Dy^{3+}$/4 mol. % $Er^{3+}$ as the dopant concentrations of the first gain fiber for laser demonstration.

A custom designed 0.25 mol. % $Dy^{3+}$/4 mol. % $Er^{3+}$ codoped double-clad ZBLAN was fabricated by FiberLabs Inc. The microscopic image of this fiber end-facet is shown in the left inset of FIG. 13. The $Dy^{3+}/Er^{3+}$ codoped fiber core has a diameter of 20 μm and NA of 0.16. The fiber has a D-shaped inner cladding with cross section of 250 μm×200 μm and with the NA of 0.5, which has increased pump absorption coefficient compared to the circular inner cladding of a regular double-clad fiber.

Figure 13:
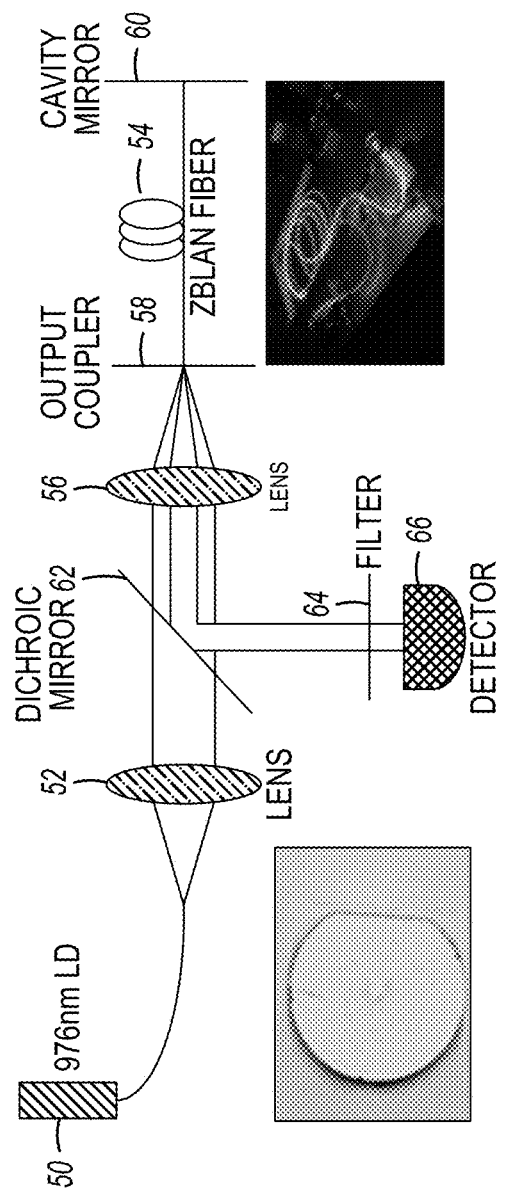
FIG. 13 shows a schematic diagram of the 3-μm $Er^{3+}$/$Dy^{3+}$ co-doped ZBLAN fiber laser pumped by a 976 nm laser diode (The inset shows a microscopic image of the gain fiber (left) and a picture of the experimental arrangement (right)).

A schematic diagram of the of the 3-μm $Dy^{3+}/Er^{3+}$ codoped ZBLAN fiber laser arrangement is shown in FIG. 13. A commercial 976 nm diode laser 50 was used as the pump source. The pump light was collimated by a $CaF_2$ lens 52 and then coupled into the D-shaped inner cladding of the $Dy^{3+}/Er^{3+}$ codoped ZBLAN fiber 54 by a focusing $CaF_2$ lens 56. Both ends of the gain fiber 54 were flat cleaved. A dichroic mirror 58 was butt-coupled to the front end of the gain fiber 54 to serve as an output coupler. Another dichroic mirror 60 was butt-coupled to the rear end of the gain fiber 54 to serve as the cavity mirror. The oscillator cavity for 3 μm laser was formed by these two dichroic mirrors. A dichroic mirror 62 with high reflection at 3 μm and high transmission at 976 nm was placed at 45° between the collimating lens 52 and the focusing lens 56 to deliver the laser beam to the detector 62. An 1850 nm long pass filter 64 was placed before the detector 62 to make sure that only the 3 μm laser was detected. A thermal detector (Thorlabs S415C) and an optical spectrum analyzer (Yokogawa, AQ6376) were used to measure the output power and optical spectrum.

Figure 14:
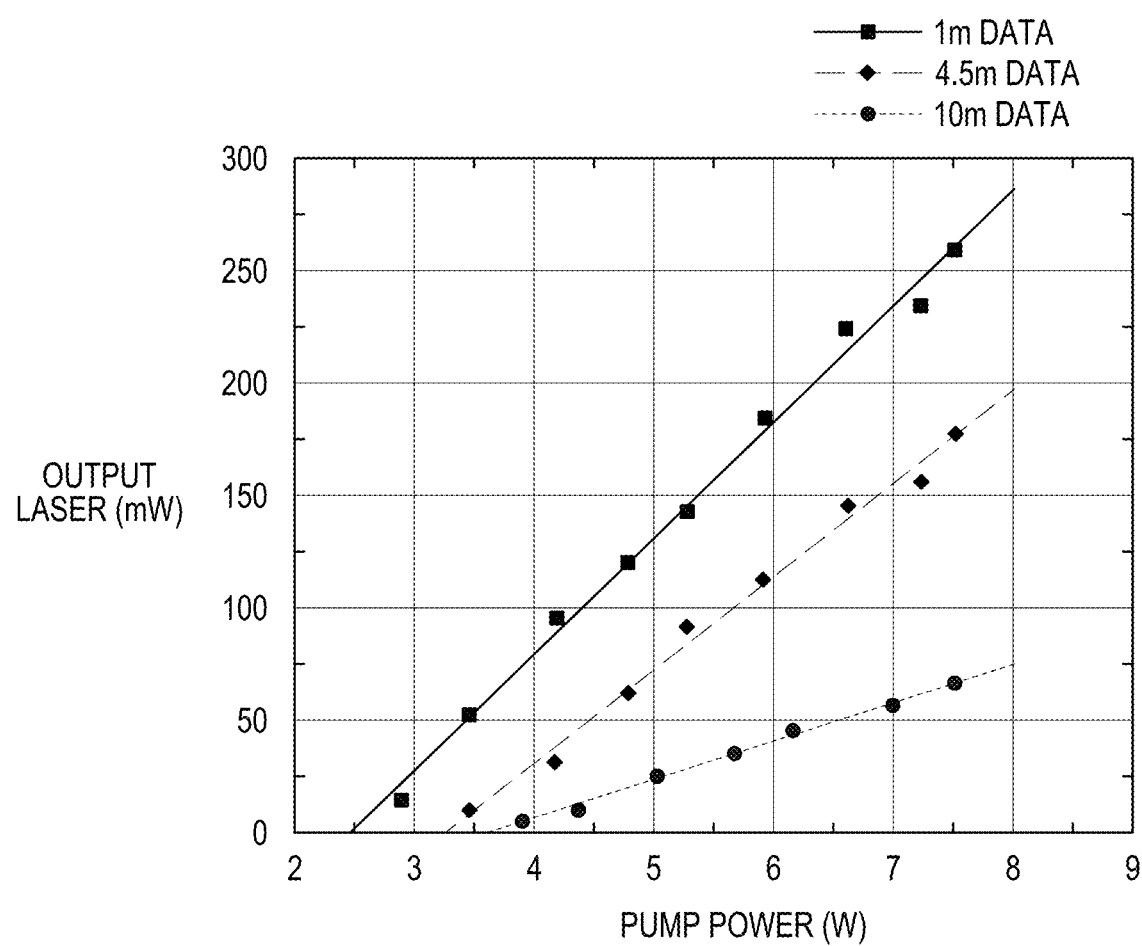
FIG. 14 shows the output power as a function of the 976 nm pump power for 1-m, 4.5-m, and 10-m Dy/Er co-doped fiber lasers.

Fiber lasers with gain fiber length of 1 m, 4.5 m, and 10 m were produced. The output power as a function of the launched pump power of the three fiber lasers were measured and are shown in FIG. 14. The threshold and slope efficiency of the 1-m fiber laser are about 2.5 W and 5.14%, respectively. An output power of 260 mW was obtained with the 1-m fiber laser at a maximum launched power 7.5 W. Further increase of the pump power could result in the fluctuation of the output power or even fiber damage due to the thermal issue of the fiber holder because it was heated by the uncoupled pump light. The output power of this laser can be further increased by improving the pump coupling efficiency, employing effective thermal management, or building the laser in all-fiber configuration using ZBLAN fiber Bragg gratings. As the gain fiber length increased to 4 m, the threshold of the fiber laser increased to 3.24 W while the slope efficiency decreased to 4.14% due to the increased propagation loss of the fiber cavity. An output power of 180 mw was obtained at a launched power 7.5 W. For the 10-m fiber laser, only 66 mW output power was obtained with a maximum launched power. The threshold and slope efficiency of this laser are about 3.6 W and 1.7%, respectively.

Figure 15:
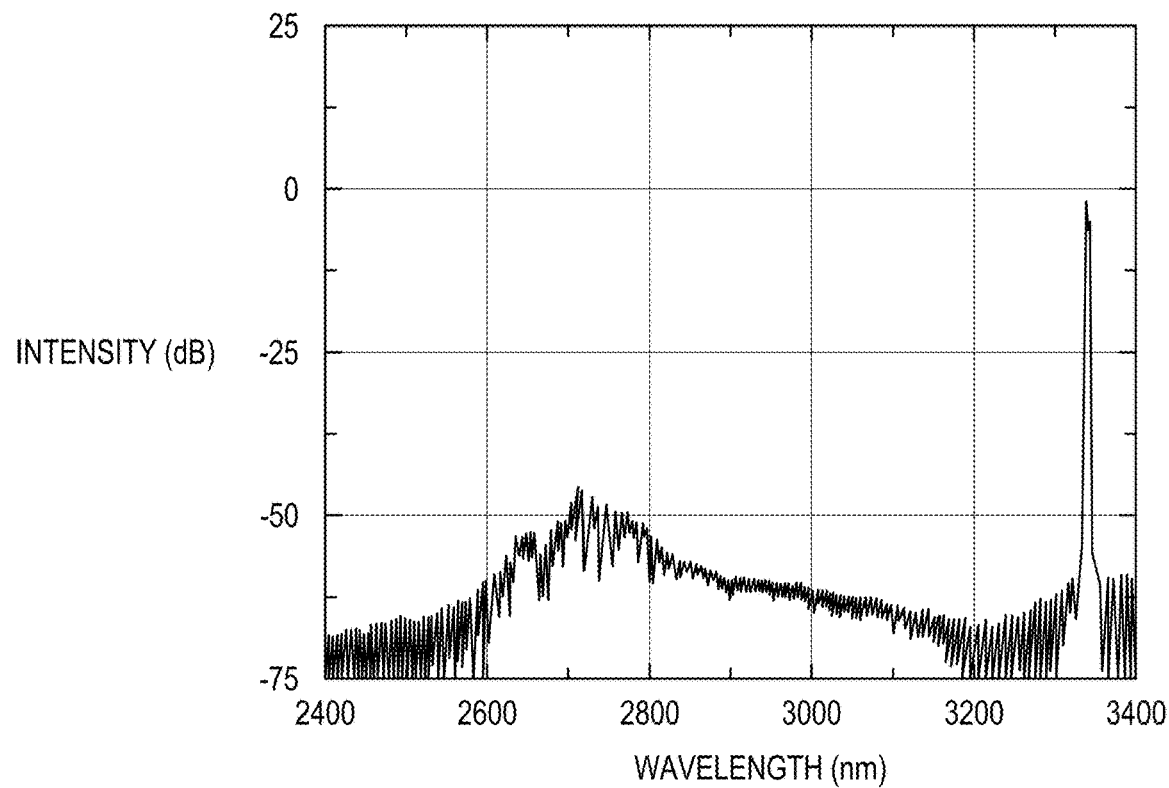
FIG. 15 shows the optical spectrum of the 10-m Dy/Er co-doped fiber laser measured in a wavelength range of 2400-3400 nm.
Figure 16:
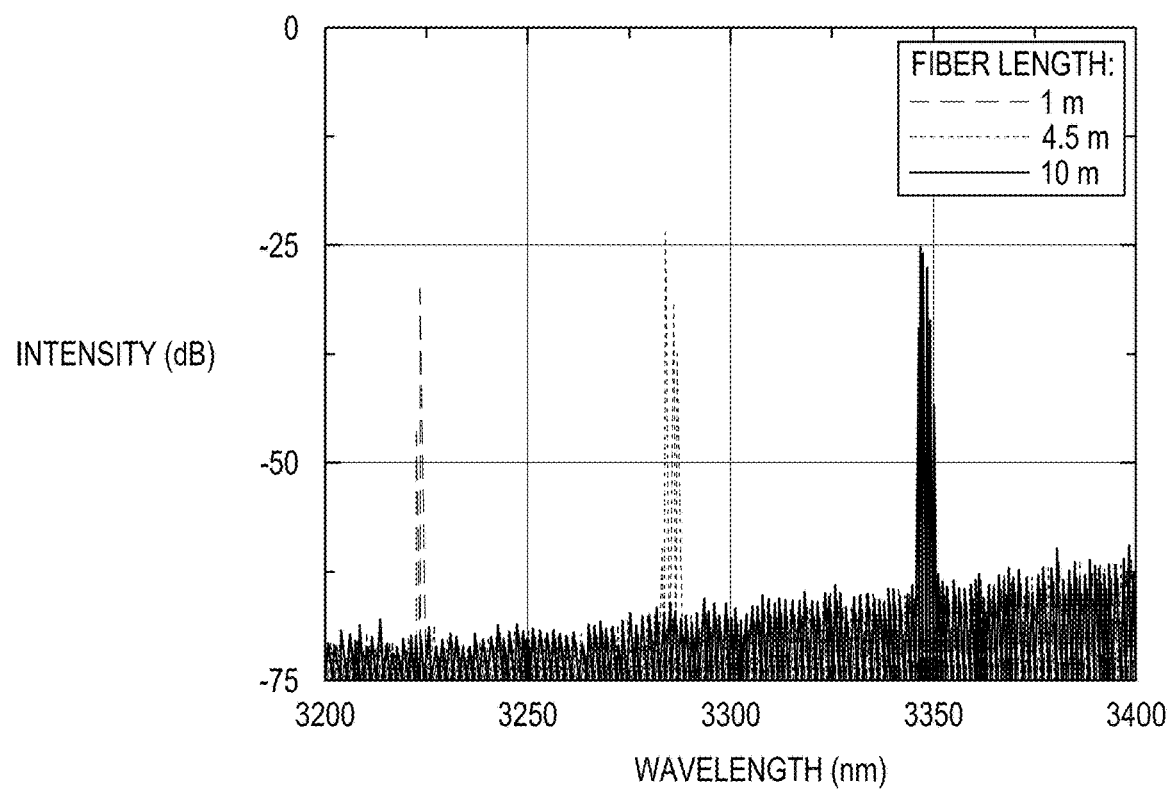
FIG. 16 shows the optical spectra of the 1-m, 4.5-m and 10-m Dy/Er co-doped fiber lasers measured at a pump power of 4.2 W.

Since there is no wavelength selective element inside the fiber laser cavity, the operating wavelength of the $Dy^{3+}/Er^{3+}$ codoped ZBLAN fiber lasers was not stable and the optical spectrum generally exhibited multiple peaks. FIG. 15 shows a typical optical spectrum of the 10-m fiber laser at a pump power of 4.5 W. In addition to a laser peak at 3.3 μm, broadband amplified stimulated emission (ASE) at 2.5-3.2 μm was also measured by the optical spectrum analyzer at a resolution of 2 nm. The optical spectra of the 1-m, 4.5-m, and 10-m fiber lasers were measured at a pump power of 7.5 W and are shown in FIG. 16. When the gain fiber length is 1 m, the laser peak is at 3.22 μm. As the gain fiber length increases to 4.5 m, the laser peak shifts to about 3.29 μm. The laser peak further shifts to 3.35 μm as the gain fiber length is 10 m. The red shift of the laser peak with the increasing gain fiber length is a general aspect of fiber lasers.

It should be noted that the efficiencies of the three $Dy^{3+}/Er^{3+}$ codoped ZBLAN fiber lasers are relatively low compared to that of singly Dy-doped ZBLAN fiber lasers because 0.25 mol. % $Dy^{3+}$ and 4 mol. % $Er^{3+}$ may not be the optimal doping levels for the $Dy^{3+}/Er^{3+}$ codoped ZBLAN fiber laser. Much higher efficiency of a $Dy^{3+}/Er^{3+}$ codoped ZBLAN fiber laser could be obtained by further optimizing the concentrations of both dopants to reduce the concentration quenching, improve the energy transfer, and even include the one-to-two optical conversion of energy upconversion transfer process in highly $Er^{3+}$-doped ZBLAN.

In summary, a $Dy^{3+}/Er^{3+}$ codoped ZBLAN fiber laser was produced, which was pumped at the 980 nm absorption band of $Er^{3+}$. A maximum output power of 260 mW at 3.22 μm with a slope efficiency of 5.14% was obtained with a 1-m 0.25 mol. % $Dy^{3+}$/4 mol. % $Er^{3+}$ codoped fiber directly pumped by a 976 nm laser diode.

While the invention is described through the above-described exemplary embodiments, it will be understood by those of ordinary skill in the art that modifications to, and variations of, the illustrated embodiments may be made without departing from the inventive concepts disclosed herein. Disclosed aspects, or portions of these aspects, may be combined in ways not listed above. Accordingly, the invention should not be viewed as being limited to the disclosed embodiments.

The invention claimed is:

1. A solid-state laser system, comprising:
   a gain medium having an optical resonator defined therein, the gain medium being co-doped with first and second active elements, the first active element being $Er^{3+}$ and the second active element being $Dy^{3+}$, wherein the gain medium includes a host material that incorporates the first and second active elements, the host material including a metal fluoride glass and a dopant concentration of $Er^{3+}$ that exceeds a dopant concentration of $Dy^{3+}$, the $Dy^{3+}$ having a concentration of no more than 0.25 mol. %; and
   a pump source coupled to the gain medium for pumping the gain medium with pump light, wherein absorption of the pump light by the $Er^{3+}$ populates the energy levels in the $Er^{3+}$ that transfer energy to the $Dy^{3+}$ to thereby produce emission through radiative transitions.

2. The laser system of claim 1, wherein the metal fluoride glass is ZBLAN.

3. The optical fiber laser system of claim 1, wherein the host material and gain medium are disposed in an optical fiber.

4. The optical fiber laser system of claim 3, further comprising first and second distributed Bragg gratings formed in the optical fiber to define the optical resonator.

5. The optical fiber laser system of claim 1, wherein the pump source is configured to operate at a wavelength of 976 nm.

6. The optical fiber laser system of claim 5, wherein the pump source is a diode laser.

7. The optical fiber laser system of claim 3, wherein the optical fiber includes a core and at least one cladding, the first and second active elements being located in the core.

8. The optical fiber laser system of claim 3, wherein the optical fiber is a double-cladding fiber (DCF).

9. A solid-state laser, comprising:
   a gain medium having an optical resonator defined therein, the gain medium being co-doped with first and second active elements, the first active element being $Er^{3+}$ and the second active element being $Dy^3$, wherein the gain medium includes a host material that incorporates the first and second active elements, the host material including a metal fluoride glass, the host material including a metal fluoride glass and a dopant concentration of $Er^{3+}$ that exceeds a dopant concentration of $Dy^{3+}$, the $Dy^{3+}$ having a concentration of no more than 0.25 mol. %; and
   wherein, when pumped with pump light by a pump source through an input facet, the gain medium generates a laser beam, wherein absorption of the pump light by the $Er^{3+}$ populates the energy levels in the $Er^{3+}$ that transfer energy to the $Dy^{3+}$ to thereby produce emission through radiative transitions.

10. The solid-state laser of claim 9, wherein the metal fluoride glass is ZBLAN.

* * * * *